(12) United States Patent
Hardman et al.

(10) Patent No.: US 10,791,663 B2
(45) Date of Patent: Oct. 6, 2020

(54) SOIL TREATMENT DEVICE

(71) Applicant: Novokraft AG, Itingen (CH)

(72) Inventors: Eric Hardman, Riehen (CH);
Benjamin Buehrer, Lieli/LU (CH)

(73) Assignee: NOVOKRAFT AG, Itingen (CH)

( * ) Notice: Subject to any disclaimer, the term of this patent is extended or adjusted under 35 U.S.C. 154(b) by 151 days.

(21) Appl. No.: 15/926,206

(22) Filed: Mar. 20, 2018

(65) Prior Publication Data

US 2018/0249620 A1 Sep. 6, 2018

Related U.S. Application Data

(63) Continuation of application No. PCT/EP2016/072509, filed on Sep. 22, 2016.

(30) Foreign Application Priority Data

Sep. 22, 2015 (DE) .......................... 10 2015 115 991

(51) Int. Cl.
*A01B 45/02* (2006.01)
*A01C 23/02* (2006.01)

(52) U.S. Cl.
CPC ............ *A01B 45/02* (2013.01); *A01C 23/026* (2013.01)

(58) Field of Classification Search
CPC ....... A01B 45/02; A01B 45/00; A01C 23/026; A01C 23/023; A01C 23/02; A01C 23/00
See application file for complete search history.

(56) References Cited

U.S. PATENT DOCUMENTS

| 2,584,322 | A | * | 2/1952 | Baldwin | ................. A01C 9/00 198/311 |
| 2,789,522 | A | | 4/1957 | Barton | |
| 4,034,686 | A | | 7/1977 | Collins | |
| 4,624,194 | A | | 11/1986 | Zinck | |

(Continued)

FOREIGN PATENT DOCUMENTS

| CA | 2 808 763 A1 | 1/2014 |
| DE | 40 28 996 A1 | 3/1992 |

(Continued)

*Primary Examiner* — Christopher J. Novosad
(74) *Attorney, Agent, or Firm* — ASLAN LAW, P.C.

(57) ABSTRACT

A ground treatment apparatus comprises a support device, injection elements, a fluid providing device that is fluidically connected to the injection elements, a drive device by which the injection elements are on the one hand lowerable and raisable in relation to the support device and on the other movable along a working direction of the ground treatment apparatus. The injection elements are insertable into the ground by being lowered in order to inject fluid into the ground in a treatment region, wherein the injection elements remain stationary during engagement in the ground in the treatment region, with relative movement in relation to the support device that is moved in the working direction, wherein the injection elements are raisable after the injection of fluid and are movable in the working direction in relation to the support device, wherein, on being lowered again, the injection elements are insertable into the ground in a further treatment region that is downstream of the first-mentioned treatment region, as seen in the working direction.

31 Claims, 11 Drawing Sheets

(56) References Cited

U.S. PATENT DOCUMENTS

| | | | |
|---|---|---|---|
| 4,658,738 A | | 4/1987 | Zinck |
| 5,054,831 A | * | 10/1991 | Ting .................. B25J 13/086 |
| | | | 294/61 |
| 5,101,745 A | | 4/1992 | Podevels et al. |
| 5,178,078 A | | 1/1993 | Pendergras |
| 5,802,996 A | | 9/1998 | Baxter |
| 5,988,291 A | | 11/1999 | Yeomans |
| 6,431,096 B1 | | 8/2002 | Engelke et al. |
| 7,100,800 B2 | | 9/2006 | Yakasovic Saavedra et al. |
| 2006/0070748 A1 | | 4/2006 | Faltysek |
| 2015/0216102 A1 | | 8/2015 | Georgoulias et al. |

FOREIGN PATENT DOCUMENTS

| | | |
|---|---|---|
| DE | 10 2015 201 091 A1 | 8/2015 |
| DE | 10 2014 105 577 A1 | 10/2015 |
| DE | 10 2015 110 547 A1 | 1/2017 |
| DE | 10 2015 115 991 A1 | 3/2017 |
| EP | 1 203 522 A1 | 5/2002 |
| GB | 2 472 229 A | 2/2011 |
| JP | S55-77909 U | 5/1980 |
| JP | H10-191737 A | 7/1998 |
| JP | 2011-030545 A | 2/2011 |
| RU | 2 031 563 C1 | 3/1995 |
| RU | 2 138 935 C1 | 10/1999 |
| SU | 493202 A1 | 11/1975 |
| SU | 686656 A1 | 9/1979 |
| WO | WO 02/074058 A1 | 9/2002 |

\* cited by examiner

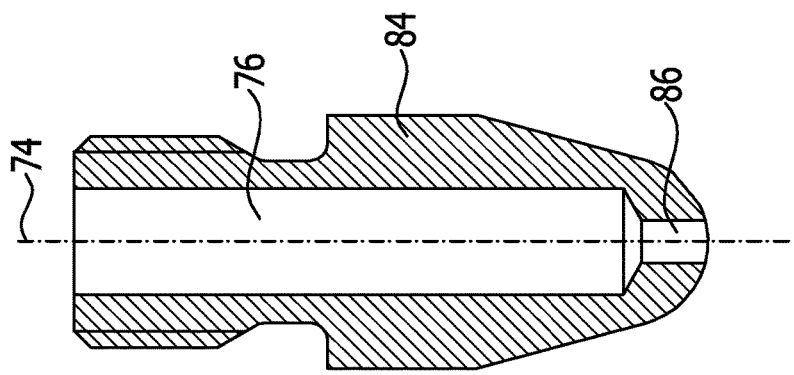
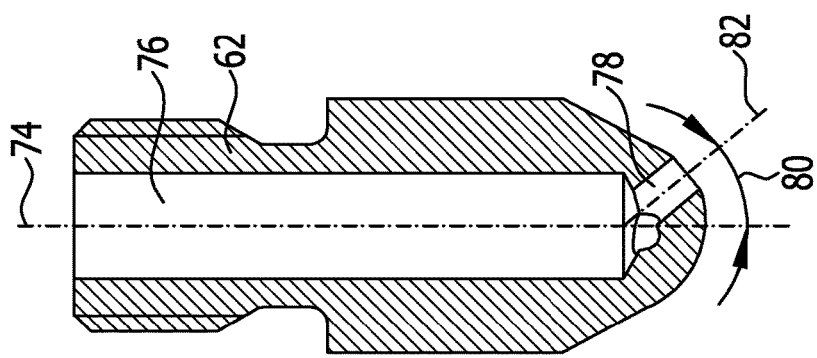
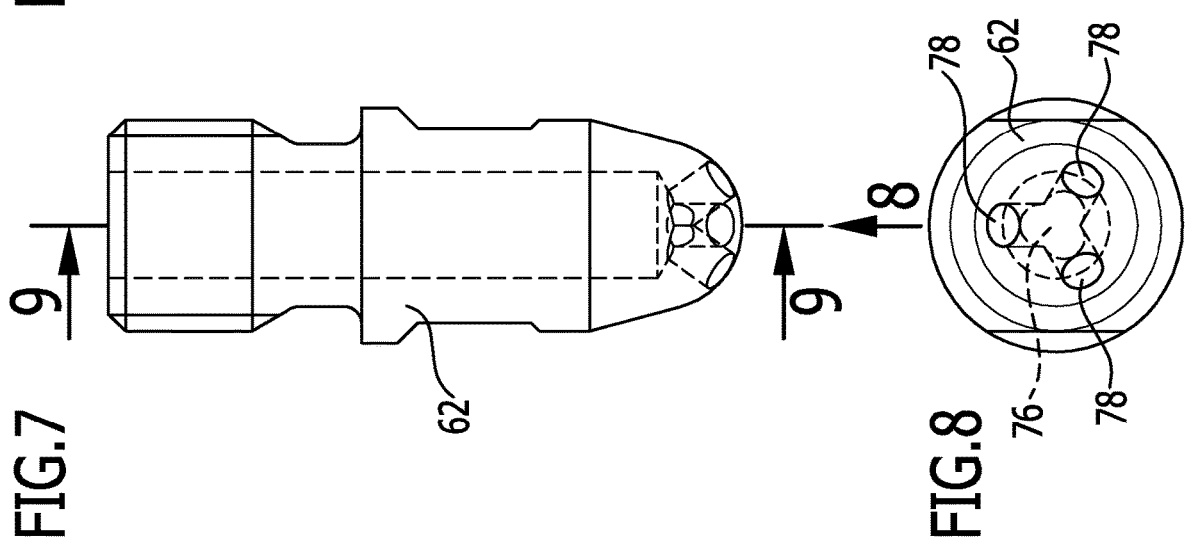

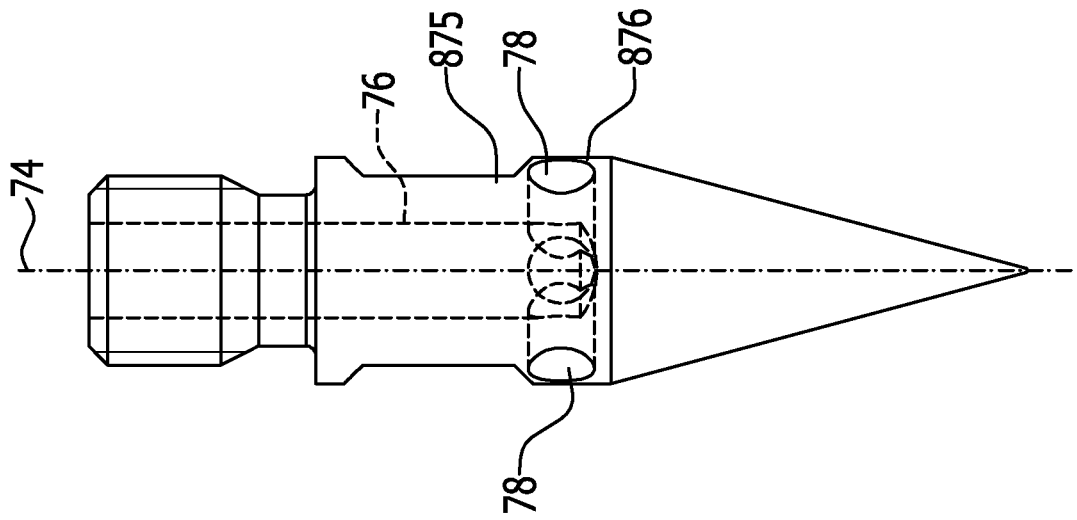
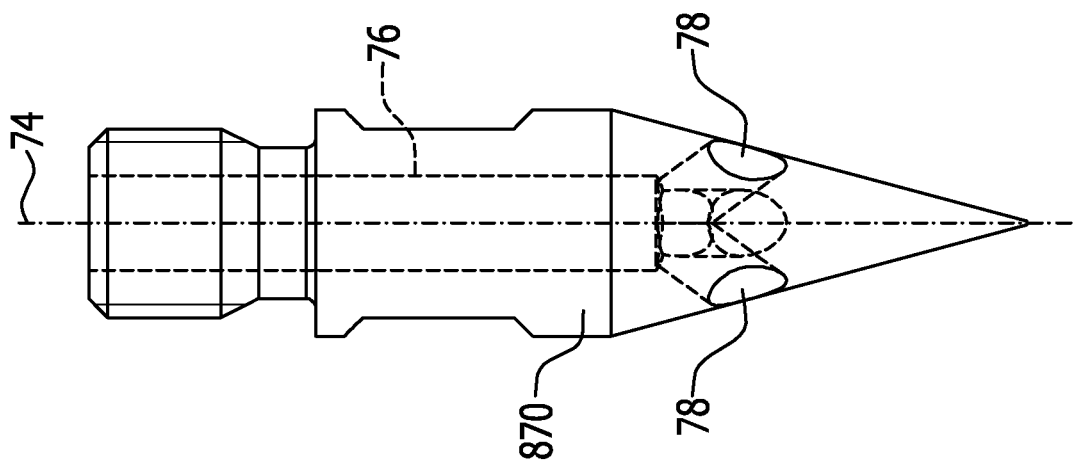

SOIL TREATMENT DEVICE

CROSS-REFERENCE TO RELATED APPLICATIONS

The present application is a continuation patent application of international application number PCT/EP2016/072509, filed on Sep. 22, 2016, and claims the priority of German application No. DE 10 2015 115 991.0, filed on Sep. 22, 2015, which are incorporated herein by reference in their entirety and for all purposes.

FIELD OF THE INVENTION

The invention relates to a ground treatment apparatus for ground on which grass is grown, in particular the ground at sports or leisure facilities, in particular with a grass conditioning device, wherein the ground treatment apparatus comprises a support device, a plurality of injection elements held directly or indirectly on the latter, and a fluid providing device that is fluidically connected to the injection elements.

BACKGROUND OF THE INVENTION

A ground treatment apparatus of this kind is used for ground management. A fluid is injected into the ground through the injection elements. The action of the fluid, in particular a compressed gas or compressed gas mixture, can loosen the soil of the ground. This is advantageous in the case of ground on which grass is grown, as improved penetration of air and water and better opportunities for roots to spread can promote the growth of grass. At the same time, the action of drainage in the ground is improved.

The present invention is described below using the example of a sports or leisure facility on which grass is grown and that has in particular a grass conditioning device. However, the present invention is not restricted to this area of application, even though it is particularly suitable therefor. Ground on which grass is grown at a sports or leisure facility is for example a soccer field, which may comprise the pitch and the area bordering it. Other examples are a baseball pitch, a football field, a golf course, which may comprise both the green and the fairway, a grass tennis court, or a racetrack or showjumping course for equestrian sport. Examples of leisure facilities are green areas in the public domain, such as parks.

The ground at sports or leisure facilities with a grass conditioning device may comprise pipework that is laid in the ground, which in an advantageous configuration is laid relatively close to the surface. Laying it close to the surface enables a high degree of efficiency in the grass conditioning device, which may be a grass heating device and/or a grass cooling device. When a grass conditioning device laid close to the surface is used, because of the fluctuations in temperature (for example, the heating of the ground and the root structure in the case of heating grass), there is a particular need for ground management that promotes the growth of grass.

The Applicant's patent applications DE 10 2014 105 577 A1 and DE 10 2015 110 547 describe apparatuses for laying pipes close to the surface for grass conditioning devices of the type described.

The present invention may be used with ground having a natural growth of grass, ground laid with turf and/or with ground having a so-called hybrid grass, which comprises a mixture of artificial grass and natural grass.

Ground treatment apparatuses of the type mentioned in the introduction are already known. For the treatment of golf courses, a apparatus commercialized under the name "Air2G2" may for example be used (www.air2g2.com). This ground treatment apparatus comprises a support device having three injection elements held thereon. The apparatus is guided manually over the ground, and for the purpose of fluid injection the apparatus is stopped and the injection elements are lowered into the ground. The apparatus may be suitable for aerating small areas of ground; for example, it is used on golf greens. However, owing to its nature the apparatus is only suitable to a very limited extent for use on relatively large ground surfaces, such as a soccer field. The apparatus has to be manually guided and stopped for each injection. Aerating relatively large ground surfaces is time-consuming and is not performed evenly.

It is the object of the present invention to provide a ground treatment apparatus of the generic type by which even relatively large ground surfaces can be managed systematically and in a time-saving manner.

SUMMARY OF THE INVENTION

In accordance with an aspect of the invention, a ground treatment apparatus for ground on which grass is grown is provided, in particular the ground at sports or leisure facilities, in particular with a grass conditioning device, wherein the ground treatment apparatus comprises a support device, a plurality of injection elements held directly or indirectly on the latter, and a fluid providing device that is fluidically connected to the injection elements. The ground treatment apparatus comprises at least one drive device by which the injection elements are on the one hand lowerable and raisable in relation to the support device and on the other movable along a working direction of the ground treatment apparatus, wherein the injection elements are insertable into the ground by being lowered in order to inject fluid into the ground in a treatment region, and wherein the injection elements remain stationary during engagement in the ground in the treatment region, with relative movement in relation to the support device that is moved in the working direction. The injection elements are raisable after the injection of fluid and are movable in the working direction in relation to the support device. The injection elements, on being lowered again, are insertable into the ground in a further treatment region that is downstream of the first-mentioned treatment region, as seen in the working direction.

BRIEF DESCRIPTION OF THE DRAWING FIGURES

The description that follows of advantageous embodiments of the invention by which one of the above-mentioned methods is performable serves, in conjunction with the drawing, to explain the invention in more detail. In the drawing:

FIG. 7 shows a side view of a nozzle of an injection element;

FIG. 8 shows a plan view of the nozzle in FIG. 7 in accordance with arrow "8" in FIG. 7;

FIG. 9 shows a side view along the line 9-9 in FIG. 7;

FIG. 10 shows an illustration in accordance with FIG. 9, with a different type of nozzle of the injection element;

FIG. 11 shows an illustration in accordance with FIG. 7, with a different type of nozzle of the injection element;

FIG. 12 shows a further illustration in accordance with FIG. 7, with a different type of nozzle of the injection element;

DETAILED DESCRIPTION OF PREFERRED EMBODIMENTS OF THE INVENTION

Figure 1:
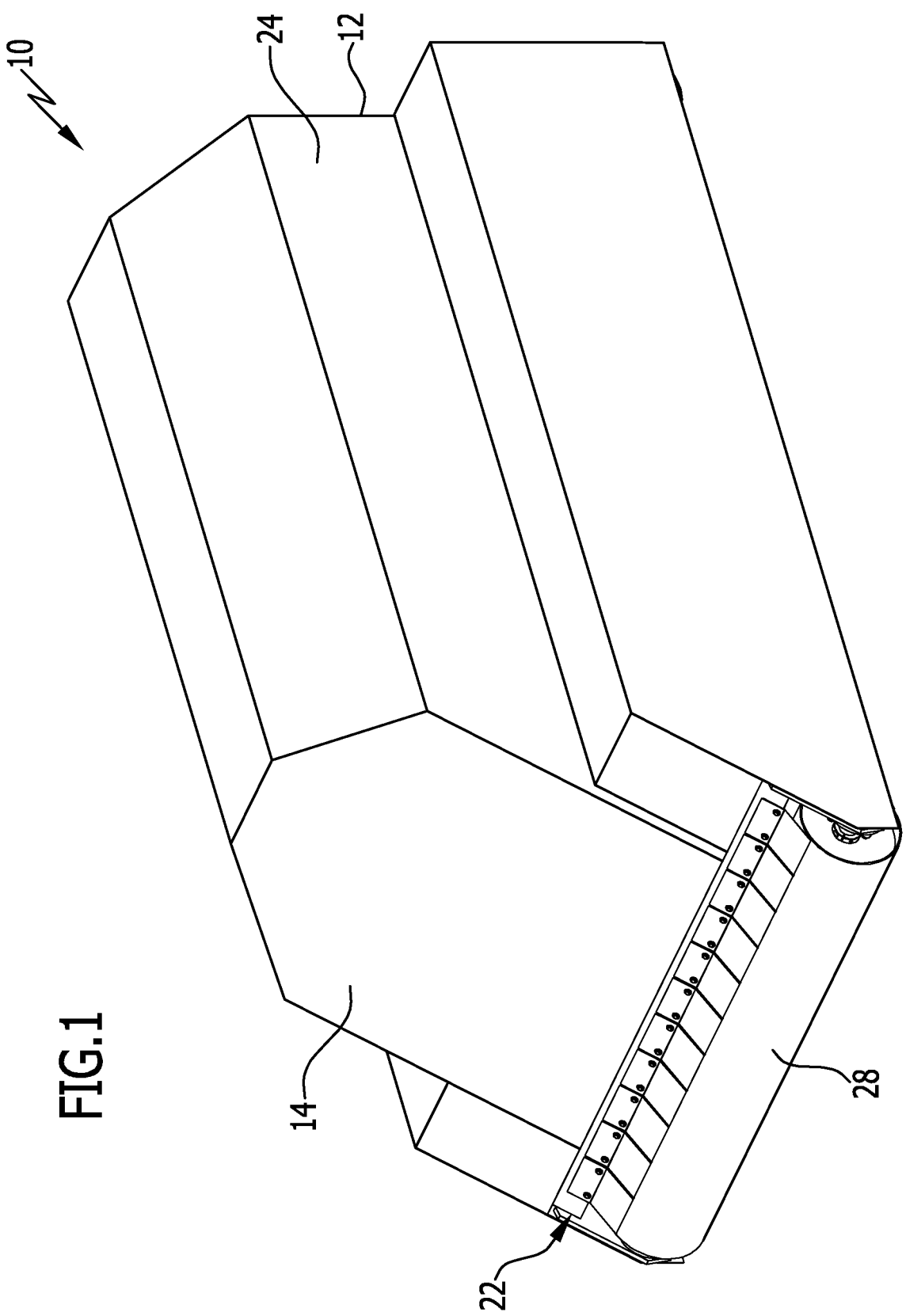
FIG. 1 shows an advantageous embodiment of a ground treatment apparatus in accordance with the invention in perspective view, comprising a support device and a housing.

Although the invention is described and illustrated herein with reference to specific embodiments, it is not intended to be limited to the details described and shown.

The invention relates to a ground treatment apparatus for ground on which grass is grown, in particular the ground at sports or leisure facilities, in particular with a grass conditioning device, wherein the ground treatment apparatus comprises a support device, a plurality of injection elements held directly or indirectly on the latter, and a fluid providing device that is fluidically connected to the injection elements. The ground treatment apparatus comprises at least one drive device by which the injection elements are on the one hand lowerable and raisable in relation to the support device and on the other movable along a working direction of the ground treatment apparatus, wherein the injection elements are insertable into the ground by being lowered in order to inject fluid into the ground in a treatment region, and wherein the injection elements remain stationary during engagement in the ground in the treatment region, with relative movement in relation to the support device that is moved in the working direction. The injection elements are raisable after the injection of fluid and are movable in the working direction in relation to the support device. The injection elements, on being lowered again, are insertable into the ground in a further treatment region that is downstream of the first-mentioned treatment region, as seen in the working direction.

In the explanations below, it is assumed for example that, when used as intended, the ground treatment apparatus is positioned in an operational position on the surface of the ground and is moved over the ground surface along a working direction that is defined by the ground treatment apparatus. When used as intended, the ground treatment apparatus can in particular define a contact plane that coincides with the surface of the ground.

Indications of position and orientation, such as "horizontal", "vertical" or similar, should be understood in the present document as relating to use of the ground treatment apparatus as intended. Here, the ground treatment apparatus is used in particular to work on ground that has a surface that is regarded as horizontal.

In the ground treatment apparatus in accordance with the invention, the plurality of injection elements is formed to be movable in relation to the support device. The injection elements can be raised and lowered by way of at least one drive device and are consequently brought closer to or moved away from the ground. Furthermore, the injection elements are movable along the working direction in relation to the support device. In the present document, "along" the direction comprises "in the working direction" and preferably also comprises "in opposition to the working direction". When the ground treatment apparatus is moved over the ground, the injection elements can be lowered and can penetrate into the ground. While the ground treatment apparatus is moving in the working direction, the injection elements can remain stationary in the treatment region and the injection elements consequently move in relation to the support device. Fluid can be applied to the ground via the injection elements, for loosening it. Then the injection elements can be raised. Thereafter, the injection elements can be moved in relation to the support device by way of the at least one drive device such that they are positioned above a further treatment region downstream of the first treatment region, as seen in the working direction. In this case, the injection elements can move, at least from time to time, in the working direction in relation to the support device at a speed exceeding the speed of the support device in the working direction. When they are lowered again, the injection elements can penetrate into the ground in the further treatment region, remain stationary in relation thereto, inject fluid and so on. When used as intended, the ground treatment apparatus thus makes possible in particular an advantageous, "quasi continuous" treatment of the ground. Preferably, the support device can be moved over the ground surface at a constant or substantially constant speed. By way of the at least one drive device, the injection elements are moved as described above, and it is possible for fluid to be injected successively in the successive treatment regions without the need to stop the ground treatment apparatus for this purpose. For this reason, the ground treatment apparatus is particularly suitable for management of large ground surfaces, in particular soccer fields.

Preferably, the ground treatment apparatus is configured such that treatment regions that succeed one another in the working direction adjoin one another or overlap one another. In this way, the whole of the ground can be managed. For example, for this purpose the possibility is provided of adjusting a movement path of the injection elements in relation to the support device along the working direction, for example in dependence on the speed of the ground treatment apparatus.

It is favorable if the at least one drive device is controllable electrically, and if the ground treatment apparatus comprises a control device for controlling the at least one drive device. In this way, the control device can be used for particularly precise control of when and/or over which movement path the injection elements are raised and lowered and/or are moved along the working direction. An input variable of the control device may in particular be the speed at which the ground treatment apparatus is moved over the ground surface.

The injection elements are lowerable and raisable by the at least one drive device, preferably in a straight line, and/or are movable along the working direction in a straight line in relation to the support device. For the purpose of linear movement of the injection elements, the at least one drive device may take a particularly simple form. This also simplifies control of the drive device, for example by the above-mentioned control device.

In a preferred embodiment of the ground treatment apparatus, the injection elements are favorably lowerable and raisable vertically or substantially vertically. As an alternative or in addition, the injection elements can be movable horizontally or substantially horizontally along the working direction in relation to the support device. The injection elements are moved for example perpendicular and/or parallel to the contact plane defined by the ground treatment apparatus, by means of the at least one drive device.

It is favorable to lift the injection elements vertically or substantially vertically for example, so that clearly defined vertical incisions in the ground are made possible. This allows oblique incisions in the ground, which may cause excessive damage to the turf, to be avoided.

It is favorable if the injection elements are displaceable along the working direction and/or for raising and lowering in relation to the support device. As a result, the injection elements can be moved along the working direction and/or raised and lowered in a straight line, in particular linearly, as mentioned above.

The at least one drive device may take various forms. The drive device is for example configured as a mechanical or purely mechanical, electrical, hydraulic, pneumatic and/or magnetic drive device. A combination of the types of functioning mentioned is also possible.

A pneumatic drive device may be acted upon by compressed gas or a compressed gas mixture by the fluid providing device.

A particularly advantageous embodiment of the ground treatment apparatus comprises, for raising and lowering the injection elements, a first drive device and a second drive device for moving the injection elements along the working direction. The first drive device advantageously takes the form of a hydraulic or pneumatic drive device and allows the injection elements to be raised and lowered. The second drive device is favorably a hydraulic or pneumatic drive device and allows the injection elements to be displaced in relation to the support device, at least in the working direction. By using two drive devices that are favorably controllable by the control device, preferably separately from one another, control of movement of the injection elements is simplified.

It may be provided for a drive device that moves the injection elements along the working direction to be deactivated while the injection elements engage in the ground. While the injection elements engage in the ground in order to apply fluid thereto, they remain stationary in the treatment region. The support device is moved on in the treatment direction. The injection elements may be moved in opposition to the working direction, in a simple manner from an engineering point of view, in relation to the support device if the drive device is deactivated or the injection elements are decoupled from the drive device. For this purpose, a pneumatic drive device could for example be connected up without being pressurized.

In a further advantageous embodiment of the ground treatment apparatus, it may be provided for it to comprise a common drive device for moving the injection elements along the working direction and for raising and lowering them. For example, this may be implemented by holding the injection elements directly or indirectly on a tension element in the form of a circulating closed loop. The tension element is for example a chain or a cable pull that circulates around gearwheels, rolls or rollers. During the circulating movement, the injection elements may on the one hand be moved along the working direction and on the other be lowered and raised.

It is advantageous if the injection elements are oriented in the direction of the ground, independently of their position in relation to the support device. This considerably simplifies positioning of the injection elements in relation to the ground. Advantageously, all that needs to be done is to lower or raise the injection elements at the appropriate time and to displace them along the working direction in relation to the support device.

It may be provided for an individual drive device to be associated with a respective injection element, for moving the injection element in relation to the support device. The injection elements may be movable individually by means of the at least one drive device. The movements of a plurality of injection elements by way of drive devices associated therewith may be synchronized or coupled by way of a control device.

An advantageous embodiment of the ground treatment apparatus in accordance with the invention comprises a holding device, having a holding part on which the injection elements are held, wherein the holding device is coupled to the support device by way of the at least one drive device. This allows a structurally simple configuration and reliable functioning of the ground treatment apparatus. The plurality of injection elements are held in common on a holding part. The holding device having the holding part is coupled to the support device by way of the at least one drive device. This provides the possibility of raising and lowering all the injection elements, and moving them along the working direction, in common. Separate drive devices for individual injection elements can be dispensed with. Apart from the structural configuration, it is possible to considerably simplify control of the at least one drive device.

If more than one drive device is present, then in particular they act on one another. For example, a drive device for raising and lowering the injection elements, and on which acts the holding device, is held on the support device by way of the drive device for displacing the injection elements along the working direction. Conversely, it may be provided for a drive device for displacing the injection elements, on which acts the holding device, to be connected to the support device by way of a drive device for raising and lowering the injection elements.

It is advantageous if, by means of the at least one drive device, a force bracing against the ground is applicable to the holding device, at least during the application of fluid. The holding device may be pressed against the ground for example with the sealing elements arranged thereon, which are mentioned below. This can avoid lifting the surface of the ground as a result of the fluid injection. The evenness of the surface of the ground can be maintained, and the quality of the surface is not impaired.

Advantageously, there are formed in the holding part through openings through which the injection elements pass and at the edges whereof the injection elements are immovably fixed or movably guided. Movement of the injection elements in relation to the holding part is conceivable for example if the injection elements strike against an obstacle when they are inserted into the ground. The movement has the effect that damage to the injection element can be prevented. For fixing the injection elements, fixing elements that are held on the edges of the through openings and through which the injection elements pass may be provided.

The holding part takes the form of a plate, at least in certain regions, and in particular takes the form of a holding plate.

The holding device may comprise at least one fixing part, which for example likewise takes the form of a plate, and which holds the holding plate and for its part is held on the drive device.

The injection elements are favorably formed to be displaceable in relation to the holding part, in particular independently of one another. As a result, damage to the injection elements, as mentioned above, if the injection elements strike against an obstacle when they are inserted into the ground can be prevented.

Favorably, a respective injection element is displaced in relation to the holding part counter to the action of a respective restoring element that biases the injection element in the direction of the ground, wherein the holding device comprises a bracing part against which the injection element is braced in the direction of the ground. In a base position, a respective injection element is biased in the direction of the ground by means of the restoring element. In the event of striking against an obstacle, the injection element can be displaced counter to the action of the restoring element and thus protected from damage. If the obstacle is removed, for example once the injection elements are raised from the ground, the injection element can be displaced back into the base position with the restoring element. The restoring element takes the form for example of a spring that is braced on one side directly or indirectly against the injection element and on the other side directly or indirectly against the holding part.

In an advantageous embodiment, it may be provided for a fluid conduit through which the injection elements are fluidically connected to the fluid providing device to be held on the holding device, in particular on the holding part. The fluid conduit comprises for example at least one tube to which the injection elements are attached in parallel. A valve may be connected upstream of each injection element, in order to ensure a more reliable functioning of the ground treatment apparatus.

The ground treatment apparatus advantageously comprises at least one sealing element that is supported on the holding device and that, in the lowered condition of the latter, lies on the ground, wherein the sealing element or an edge of the sealing element surrounds at least one injection element. For example, the sealing element or an edge of the sealing element surrounds a plurality of injection elements, in particular all the injection elements. By way of the sealing element, on the one hand the bracing force of the holding device may be exerted on the ground. On the other, it can be ensured that the injected fluid does not escape through the ground surface but remains in the ground.

Advantageously, a respective sealing element for lying on the ground is associated with each injection element, wherein the injection element passes through the sealing element and is preferably oriented to be concentric with the sealing element. The sealing element takes the form for example of a plate or disk and the injection element passes centrally through it.

The sealing element or elements is/are advantageously supported on the holding part, the bracing part or the fixing part by way of a mounting part.

It may be provided for a respective sealing element to be fixed to an injection element associated therewith.

It has proved advantageous if, after the injection elements have been inserted into the ground and before the fluid injection is performed, they are raisable by means of the at least one drive device in order to provide a free space in the ground, below the injection elements. As they engage in the ground, the injection elements may remain stationary in the treatment region in relation to the working direction of the ground treatment apparatus, wherein the support device is moved further in the working direction. The term "stationary" does not exclude the possibility that the injection elements can be raised with the at least one drive device after being inserted into the ground and before the fluid injection is performed. For example, the injection elements are raised slightly, by approximately 0.3 cm to 0.8 cm. In practice it has been found that it is possible to achieve a better effect of loosening the soil of the ground because of the free space produced.

Optionally, with a ground treatment apparatus of the type that is mentioned in the introduction and whereof the injection elements are for example lowerable and raisable in one of the ways described in the present document, it may be provided, after the injection elements have been inserted into the ground and before the fluid injection is performed, for them to be raisable by means of the at least one drive device, in order to provide a free space in the ground, below the injection elements. With the features of a ground treatment apparatus of the type mentioned in the introduction, these features can form the basis of an independent invention. Optionally, in this case additional features may be provided, and these are comprised in the present disclosure.

Favorably, a fluid injection that comprises at least one of the following parameters is executable:

individual pressure stroke, or a plurality of successive pressure strokes;

fluid pressure of approximately 5 bar to 10 bar;

duration of each pressure stroke approximately 0.1 s to 0.5 s;

depth of engagement of the injection elements in the ground approximately 5 cm to 15 cm.

In practice, a fluid injection having the following parameters has for example proved advantageous: individual pressure stroke of approximately 7 bar for a duration of approximately 0.3 s to a depth of approximately 5 cm to 10 cm.

The injection elements favorably take the form of lances or comprise lances.

The injection elements are advantageously provided with a respective nozzle at the end or in an end portion.

In the case of a ground treatment apparatus of the type mentioned in the introduction, it may optionally and favorably be provided for the injection elements to be provided with a respective nozzle at the end or in an end portion. With the features of a ground treatment apparatus of the type mentioned in the introduction, these features can form the basis of an independent invention. Optionally, in this case additional features may be provided, and these are comprised in the present disclosure.

It is advantageous if the nozzle comprises at least one exit channel for fluid that is oriented at an angle to an axial supply channel of the injection element. The term "axial" relates for example to a lance shape of the injection element. The axial supply channel runs for example centrally, and the exit channel is oriented at an angle to the supply channel. As a result, fluid exits from the injection element not axially, but laterally at an angle to the axis.

It is favorable if two or more exit channels that are arranged symmetrically to one another on the nozzle, in particular three exit channels, are provided. As a result of the two or more exit channels, fluid can be applied to the ground around a respective nozzle, forming to a certain extent a "fluid mist" by means of which particularly good loosening of the soil of the ground can be achieved.

The angle between the at least one exit channel and the axial supply channel may be for example approximately 10° to 50°, advantageously approximately 40°. With a different configuration of a nozzle, an angle of 90° or approximately 90° can be provided between the at least one exit channel and the axial supply channel. A nozzle of this kind is used for example in the case of hybrid grass.

The end of the nozzle may be pointed or rounded in form. In practice, a pointed nozzle has proved more favorable for use in the case of hybrid grass in order to pierce the textile structure, which receives fibers of artificial grass, of the hybrid grass. A rounded nozzle has proved more favorable for use with natural grass or laid turf.

The nozzle may take a form that tapers in the direction of the end, for example tapering conically. The at least one exit channel for fluid may be arranged in the region of the taper.

The "fluid mist" has already been touched on. The fluid mist may also be regarded as an effective region of a respective fluid injection of an injection element.

It is advantageous if the injection elements are positioned in relation to one another in this way if effective regions of the fluid injections of the individual nozzles respectively occurring in the treatment region overlap one another or adjoin one another. This allows it to be ensured that fluid is applied to and loosens the treatment region to the greatest possible extent over the entire volume.

The injection elements are advantageously of identical form.

The ground treatment apparatus may have for example ten or more injection elements, wherein favorably 20 or more injection elements are provided. A concrete configuration that is described below comprises for example 26 injection elements. In this ground treatment apparatus, for example four rows of 6, 7, 6 and 7 injection elements are provided.

In the case of advantageous embodiments of different types, 13 injection elements may for example be provided in a more compact ground treatment apparatus (e.g. in two rows of 6 and 7), or 39 injection elements in a relatively large ground treatment apparatus (e.g. in six rows of 6, 7, 6, 7, 6 and 7).

The number of injection elements is advantageously selectable in dependence on a respective use. Accordingly, it may be provided for injection elements to be addable to the ground treatment apparatus or removable therefrom.

The injection elements may be entirely or partly replaceable in order to replace them in the event of wear or to adapt them to the nature of the ground, depending on the use. For example, the nozzle is in particular replaceable.

It is advantageously possible to replace, add or remove injection elements manually and/or without tools.

In practice, it has proved favorable if the injection elements are at a spacing of approximately 15 cm to 30 cm from one another.

Favorably, the injection elements are evenly spaced from one another.

It is particularly advantageous if the injection elements are arranged in a regular pattern in relation to one another, in particular a hexagonal or rectangular pattern.

The injection elements may be arranged along one or more rows. The injection elements of adjacent rows may be in a staggered formation.

In a concrete configuration, it may be provided for the ground treatment apparatus to comprise at least one first group and at least one second group of injection elements that are arranged in a first row and a second row respectively, wherein the injection elements of the first row are arranged staggered in relation to the injection elements of the second row. This allows for example a hexagonal arrangement of the injection elements to be achieved if a respective injection element of the second row is arranged staggered centrally between two injection elements of the first row and is at a spacing therefrom that corresponds to the spacing between the injection elements of the first row.

In practice, a penetration depth of the injection elements into the ground of approximately 5 cm to 15 cm has proved favorable.

If the ground has pipework of a grass conditioning device, the injection elements are advantageously only inserted into the ground to the depth at which the pipework is laid. It is favorable if the penetration depth is smaller, in order to prevent the injection elements from striking against the pipework and to prevent any damage from resulting.

It may be provided for the ground treatment apparatus to comprise an adjustment device by means of which the penetration depth of the injection elements into the ground is adjustable. For example, the injection elements are adjustable in relation to the holding device, for example the holding part thereof.

The fluid may be or comprise a compressed gas or a compressed gas mixture. A compressed gas mixture that may be used is in particular compressed air.

As an alternative or in addition, the fluid may be or comprise a liquid. For example, the liquid is or comprises a nutrient solution for the grass cover.

It is favorable if the fluid providing device comprises a compressor for providing fluid and a storage device, fluidically connected thereto, for the fluid, which is fluidically connected to the injection elements. The compressor is in particular a compressed air compressor by means of which compressed air can be conveyed to the storage device.

For driving the compressor, the ground treatment apparatus may have an independent drive device that may be integrated in the compressor. It is also conceivable for the compressor to be drivable from outside, for example by way of a traction vehicle for the ground treatment apparatus.

Favorably, the fluid providing device comprises a fluid conduit to which the injection elements are attached in parallel.

It has proved advantageous in practice if the support device is configured as or comprises a support frame.

The support frame may in particular be a metal frame.

It is favorable if at least one in particular roller-shaped surface contact element is arranged on the support device for lying on the ground surface and is arranged upstream or downstream of the injection elements, as seen in the working direction. For example, a roller-shaped surface contact element is arranged upstream of the injection elements as seen in the working direction, and enables the ground to be leveled if necessary. As an alternative or in addition, a further roller-shaped surface contact element may be provided downstream of the injection elements as seen in the working direction. Any unevenness of the ground as a result of the fluid injection may be leveled by this surface contact element.

Favorably, the ground treatment apparatus comprises a motor drive for travelling on the ground surface. In an advantageous embodiment, it may be provided for the ground treatment apparatus to take a form that is self-driving and self-steering, so that autonomous management of the ground may be carried out.

In a different embodiment, it may be provided for the ground treatment apparatus to comprise a coupling device for coupling to a traction or pusher vehicle. The traction or pusher vehicle may have an auxiliary power takeoff by which the at least one drive device and/or any drive device for the compressor can be driven.

The coupling device may take a form such that the ground treatment apparatus may, at least in part, be coupled raisably and/or lowerably to the traction vehicle.

The ground treatment apparatus may comprise a housing that covers the support device such that the support device and components held thereon are protected.

The present invention also relates to a method for treating ground on which grass is grown, in particular the ground at sports or leisure facilities, in particular with a grass conditioning device. In a method in accordance with the invention, a ground treatment apparatus of the above-mentioned type may be used. The apparatus may be moved over the ground in a working direction, wherein the injection elements are inserted into the ground by being lowered in order to inject fluid into the ground in a treatment region, wherein the injection elements remain stationary during engagement in the ground in the treatment region, with relative movement in relation to the support device that is moved in the working direction, wherein the injection elements are raised after the injection of fluid and are moved in the working direction in relation to the support device, wherein, on being lowered again, the injection elements are inserted into the ground in a further treatment region that is downstream of the first-mentioned treatment region, as seen in the working direction.

The advantages that were mentioned in connection with the explanation of the ground treatment apparatus in accordance with the invention may be achieved when the method in accordance with the invention is performed. In this regard, the reader may be referred to the statements above. Advantageous exemplary embodiments of the method become apparent from advantageous exemplary embodiments of the ground treatment apparatus in accordance with the invention.

The present disclosure further relates to a method for treating ground with a ground treatment apparatus of the type mentioned in the introduction, whereof injection elements are lowerable and raisable for example in one of the ways described in the present document. With a method of this kind, in accordance with the invention it may be provided, after the injection elements have been inserted into the ground and before the fluid injection is performed, for them to be raised by means of the at least one drive device, in order to provide a free space in the ground, below the injection elements. This can form the basis of an independent method in accordance with the invention. Optionally, additional features may be provided for defining advantageous exemplary embodiments of the method, and these are comprised in the present disclosure.

The present disclosure further relates to a method for treating ground with a ground treatment apparatus of the type mentioned in the introduction, wherein conduits of a grass conditioning device are laid in the ground. With a method of this kind, in accordance with the invention it may be provided for the injection elements to be inserted into the ground only as far as or by less than the depth at which the conduits (pipework) are laid, and for the fluid injection to be performed such that regions between adjacent conduits and below the conduits are reached by the injected fluid. This can form the basis of an independent method in accordance with the invention, in which effective loosening of the soil of the ground is also achieved between and below the conduits, and at the same time it is possible to avoid damaging the conduits. It may be provided for the depth at which the conduits are laid to be detected by the apparatus automatically. Optionally, additional features may be provided for defining advantageous exemplary embodiments of the method, and these are comprised in the present disclosure.

The drawing shows an advantageous embodiment of a ground treatment apparatus in accordance with the invention, which is designated as a whole by the reference numeral 10, designated "the apparatus" 10 below for simplicity. The apparatus 10 is used in particular for ground management of ground on which grass is grown. This ground is in particular the ground at sports facilities with a grass conditioning device, for example soccer fields.

The apparatus 10 has a front side 12 and a rear side 14. "Front side" and "rear side", like the further indications of position and orientation, should be understood in relation to use of the apparatus 10 as intended. When used as intended, the apparatus 10 is moved over the ground surface 18 in an operating position for working on the ground 16, in a working direction 20. Movement of the apparatus 10 over the ground surface 18 is described below, in particular by the example of FIGS. 13 to 17.

The apparatus 10 comprises a support device 22 that is covered by a protective housing 24 and is only shown in FIG. 1. The support device 22 comprises a support frame 26, which in particular takes the form of a metal frame and comprises longitudinal, transverse and oblique bearers.

Further, the support device 22 comprises, on the front side 12 and on the rear side 14, roller-shaped surface contact elements 28. The surface contact elements 28 are rotatable about axes of rotation 30 that are oriented transversely in relation to the working direction 20. The weight of the apparatus 10 is distributed evenly over the ground surface 18 by the surface contact elements 28. The surface contact elements 28 serve to level the ground surface 18 before and after the apparatus 10 has worked thereon.

Figure 18:
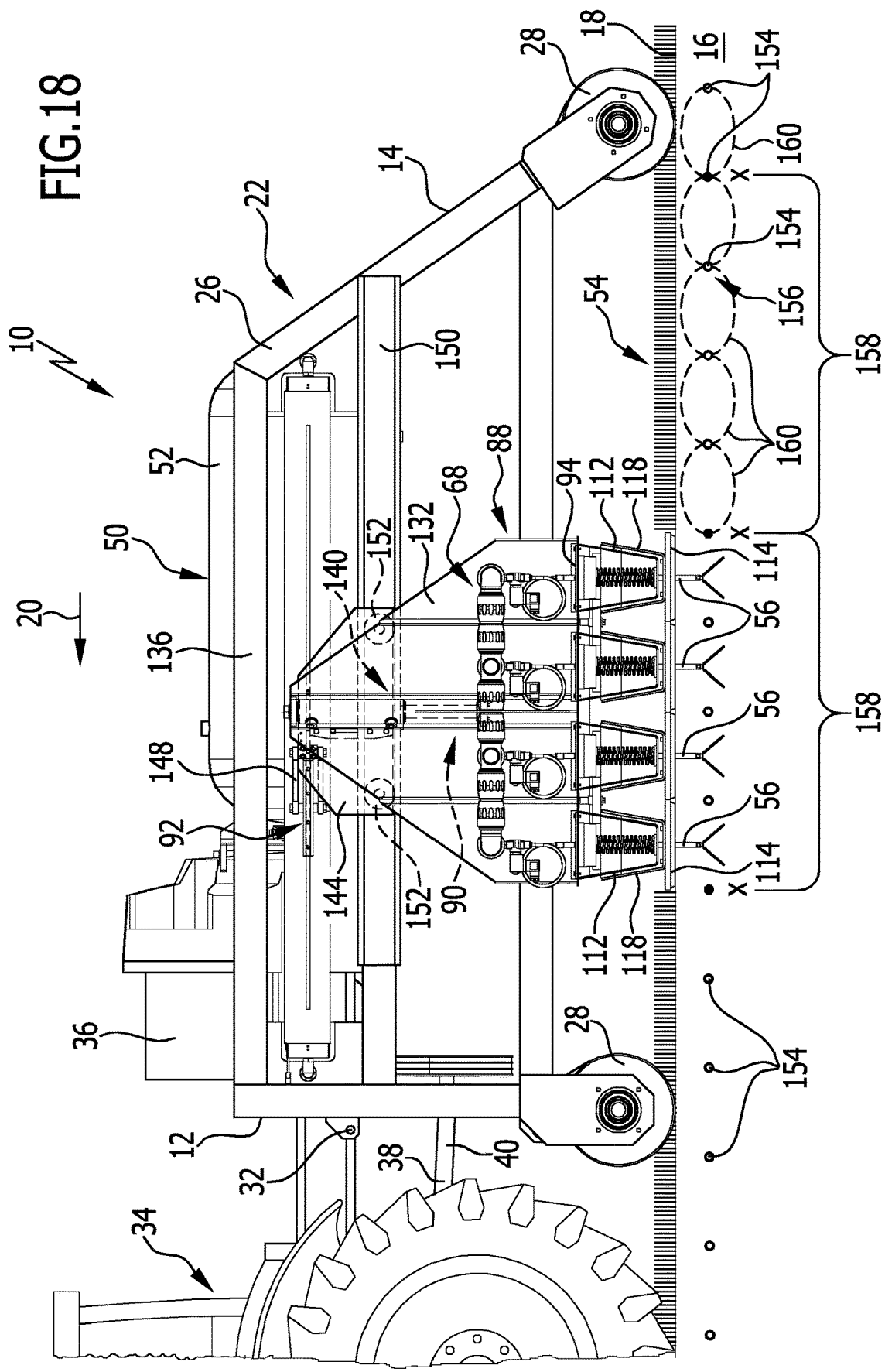
FIG. 18 shows an enlarged illustration of FIG. 15, FIG. 15 showing schematically the injection of fluid into the ground.

Further arranged on the support frame 26, at the front side 12, is a coupling device 32 (FIG. 18). A traction vehicle 34, in the present case a tractor, can be coupled to the apparatus 10 by way of the coupling device 32. The traction vehicle 24 draws the apparatus 10 over the ground surface 18.

In another type of configuration, it may be provided for the apparatus 10 to be self-driving and self-steering and to be able to move over the ground surface 18 autonomously.

The support frame 26 further receives a fluid providing device 35 of the apparatus 10. This has a compressor 36 by which a gas mixture, in the present case in particular air, can be compressed. The compressor 36 is held adjacent to the front side 12 and is drivable by an auxiliary power takeoff of the traction vehicle 34. For this purpose, by way of a gear 32, a shaft 40 of the auxiliary power takeoff 38 can drive a drive device that is integrated in the compressor 36. In the present case, the gear 32 takes the form of a belt drive with belt pulleys 44, 46 on the shaft 40 and on the compressor 36, and a belt 48 connecting these.

The compressor 36 conveys compressed air into a storage device 50 of the fluid providing device 35, which takes the form of a compressed air container 52. The container 52 is held centrally at the upper side of the support frame 26.

Compressed air is injected into the ground 16, in a manner described below, to loosen it and to promote the growth of grass on the ground 16. The grass cover 54 on the ground 16 is illustrated schematically in FIG. 18 and omitted from the rest of the Figures.

For injecting compressed air into the ground 16, the apparatus 10 comprises a multiplicity of injection elements 56. In the present case, in particular 26 injection elements 56 are provided. The injection elements 56 are of identical form, and the mounting thereof on the support device 22 is likewise identical, so only one injection element 56 is discussed below.

Figure 3:
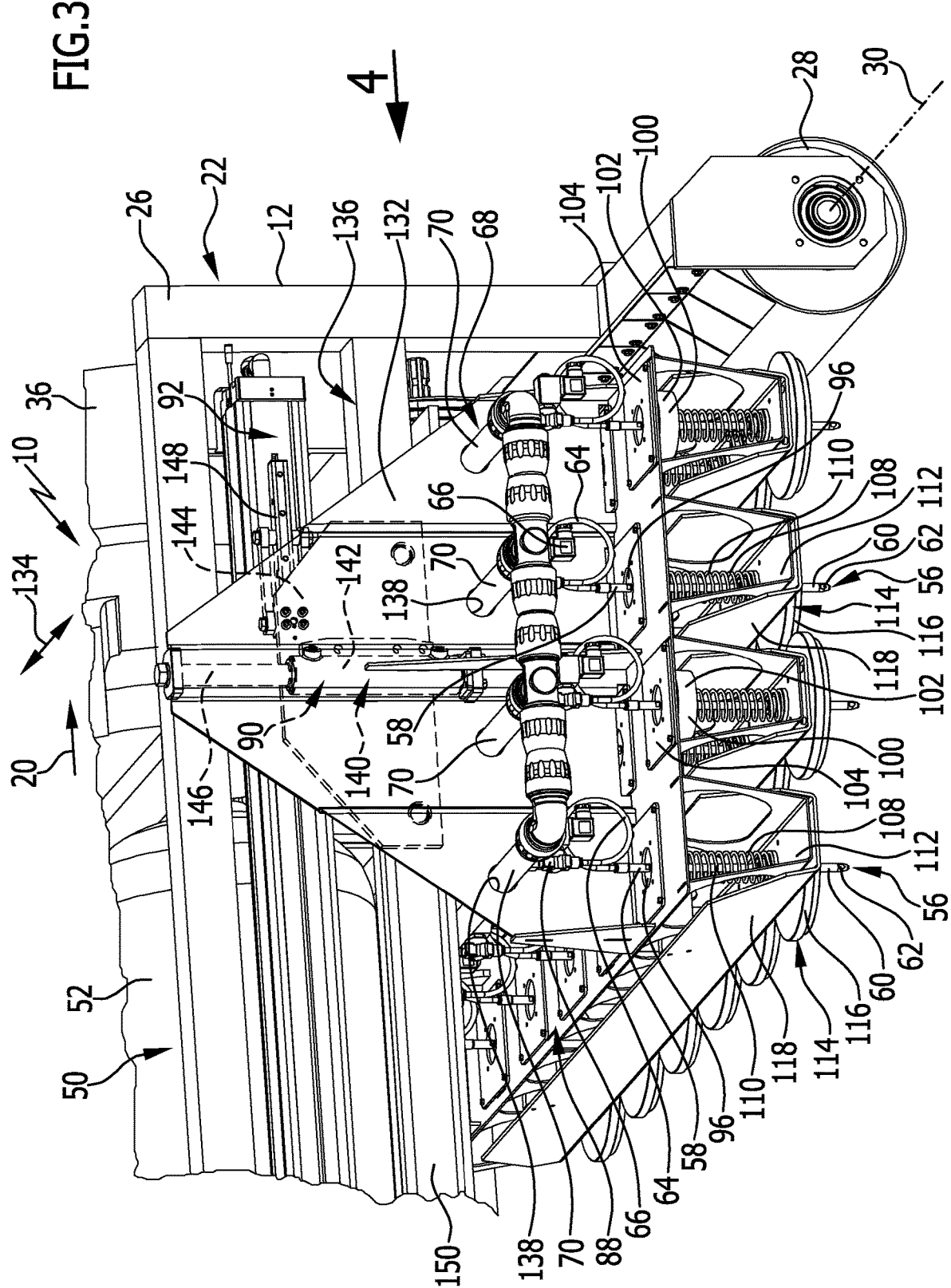
FIG. 3 shows an enlarged detail view of the ground treatment apparatus in FIG. 2.
Figure 6:
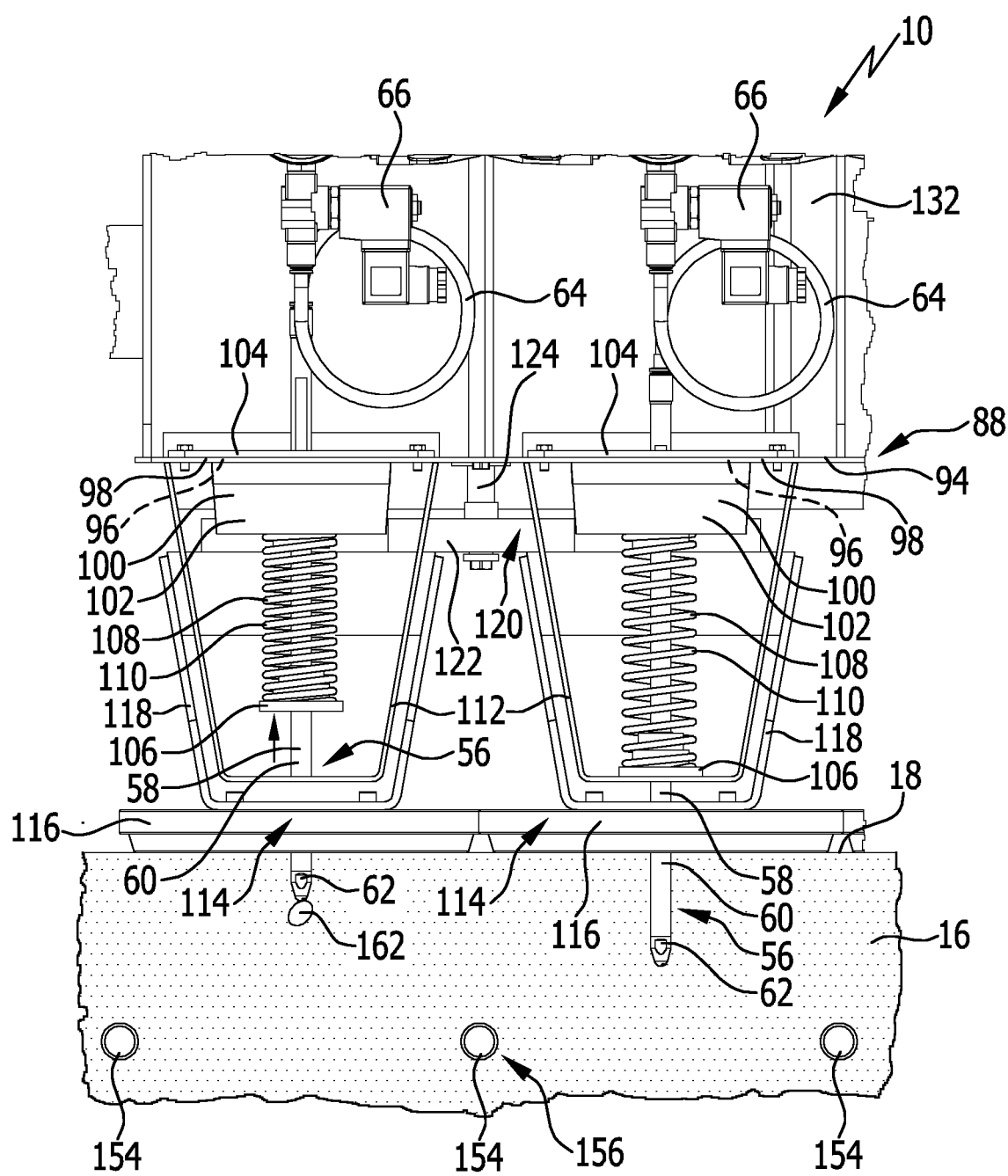
FIG. 6 shows an enlarged detail view of a holding device with injection elements of the ground treatment apparatus held thereon, wherein the injection elements engage in ground to be managed.

As is clear in particular from FIGS. 3 and 6, the injection element 56 comprises a lance 58 that has a tube 60, and a nozzle 62 arranged on the end of the tube 60. On the side of the tube 60 remote from the nozzle 62, the injection element 56 has a flexible hose conduit 64, and upstream of the latter a valve 66. The injection elements 56 are attached in parallel to a fluid conduit 68 of the fluid providing device 35 by way of the valves 66.

In the present case, the fluid conduit 64 comprises four tubes 70 that are oriented parallel to one another and are fluidically connected to one another.

The fluid conduit 68 is fluidically connected to the container 52, and for this purpose a pipeconduit or hose conduit (not illustrated in the drawing) is for example provided. Compressed air can flow out of the container 52 and into the fluid conduit 68 and through the latter into the injection elements 56. The valves 66 may be self-opening valves or preferably valves that are switchable by a control device 72 of the apparatus 10.

Figure 4:
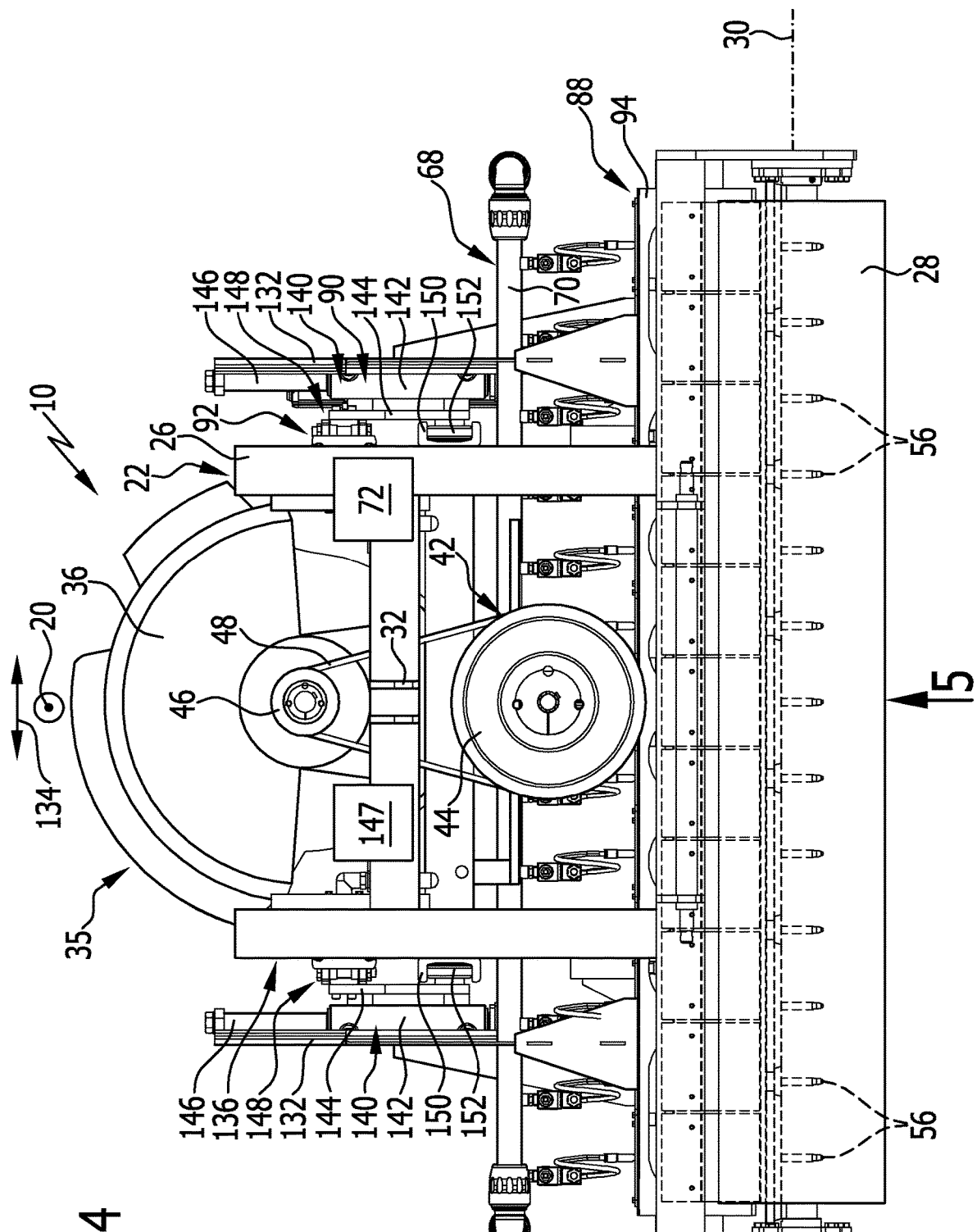
FIG. 4 shows a front view of the ground treatment apparatus, in the direction of view in accordance with arrow "4" in FIG. 3.
Figure 5:
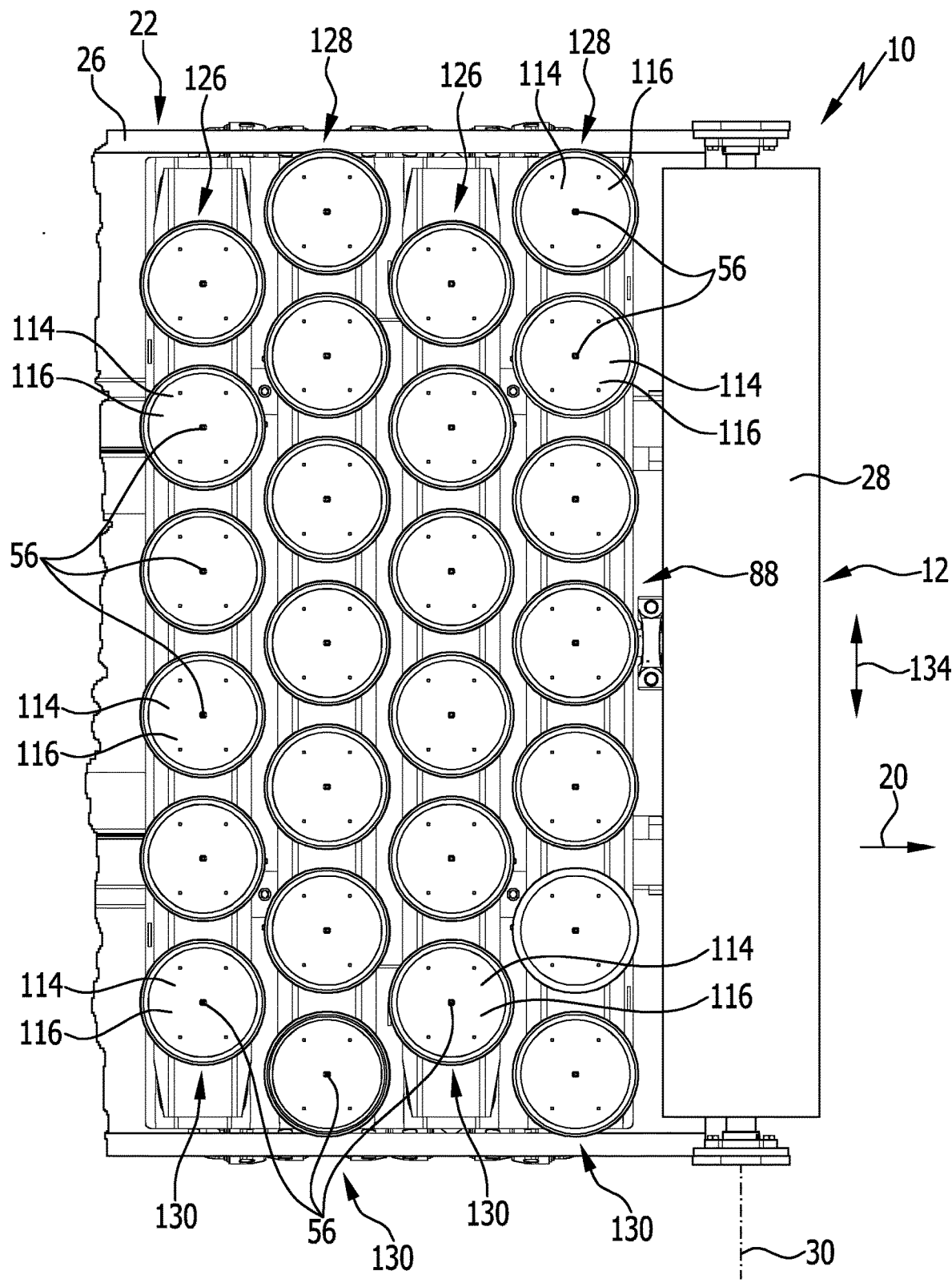
FIG. 5 shows a partial view of the ground treatment apparatus from below, in the direction of view in accordance with arrow "5" in FIG. 4.

The control device 72 is illustrated schematically in FIG. 4 and takes the form of an electrical control device. Input lines and output lines (not illustrated in the drawing) may be provided to supply input signals to the control device 72 and to emit output signals. Output signals may for example be supplied to the valves 66, or to the drive devices 90, 92 of the apparatus 10, which are explained below.

As is clear in particular from FIGS. 7 to 12, the lance 58 defines an axis 74, wherein the nozzle 62 and the tube 60 are oriented coaxially in relation to one another. The nozzle 62 that is shown in FIGS. 7 to 9 comprises an axial supply channel 76 for fluid, which is fluidically connected to a corresponding supply channel of the tube 60. Further, the nozzle 62 comprises exit channels 78 for fluid at the end of the nozzle 62. In the present case three exit channels 78 are provided, which are arranged on the nozzle 62 symmetrically in relation to one another. There is an angular spacing between the exit channels 78 about the axis 74 of in each case 120°.

The exit channels 78 each form an angle 80 with the supply channel 76. The angle 80 is defined by the relatively small angle between the axis 74 and a respective axis 82 of an exit channel 80 (FIG. 9).

In an advantageous embodiment of the apparatus 10, the angle 80 is for example approximately 10° to 50°, in particular approximately 40°.

FIG. 10 shows a different type of configuration of a nozzle, given the reference numeral 84. In the case of the nozzle 84, only one exit channel 86 is provided, oriented coaxially in relation to the supply channel 76 and accordingly running axially.

The nozzles 62 and 84 take a form that is rounded at the end and are preferably used when the ground 16 to be worked has a natural grass or laid turf. In a variant, both nozzles 62, 84 may take a pointed form and may for example be used with ground 16 that has a hybrid grass.

FIG. 11 shows, in a manner corresponding to FIG. 7, a nozzle that is designated by the reference numeral 870 and that likewise has an axial supply channel 76 and exit channels 78 that each form an angle 80 with the supply channel. As in the case of the nozzle 62, the angle 80 is for example approximately 10° to 50°, for example approximately 40°.

The nozzle 870 takes a pointed form at its end and is suitable for example for working on ground 16 with a natural grass or laid turf, but may also be used with hybrid grass.

In a manner corresponding to FIG. 7, FIG. 12 shows a nozzle designated by the reference numeral 875. The nozzle 875 comprises an axial supply channel 76 and exit channels 78 that are oriented at an angle 80 in relation to the supply channel 76. In the case of the nozzle 875, the angle 80 is 90° or approximately 90°, that is to say that the exit channels 78 are oriented perpendicular or substantially perpendicular to the axis 74.

The nozzle 875 takes a pointed form at its end and is suitable in particular for management of ground 16 with hybrid grass. The pointed configuration makes it possible to pierce the layer of the hybrid grass that receives the plastics fibers. The orientation of the exit channels 76 prevents them from becoming clogged by plastics parts of the hybrid grass.

Whereas fluid can exit from the nozzles 62, 870 and 875 obliquely outward or to the side, fluid from the nozzle 84 rather exits from the nozzle axially.

All the nozzles 62, 84, 870 and 875 taper in the direction of the end, wherein in the case of the nozzles 62, 84 and 870 the exit channels 78 and 86 respectively are located in the region of the taper. In the case of the nozzle 875, by contrast, the exit channels 78 are not located in the region of the taper but in the region of a cylindrical or substantially cylindrical portion 876 at which the taper has not yet begun.

Depending on the ground 16 to be worked and the growth of grass thereon, in the apparatus 10 the nozzles 84, the nozzles 870 or the nozzles 875 may be used instead of the nozzles 62. The statements below in relation to the nozzle 62 apply correspondingly to the nozzles 84, 870 and 875.

As is further clear in particular from FIGS. 3 to 6, the injection elements 56 are held on a holding device 88. The injection elements 56 are movably held in common on the support frame 26 by way of the holding device 88, wherein the holding device 88 is movably held on the support frame 26 by way of two drive devices 90 and 92.

The holding device 88 comprises a holding part 94 that takes the form of a holding plate. In the present case, the holding part 94 is oriented horizontally and parallel to a contact plane of the apparatus 10 that is defined in the present case by the surface contact elements 28.

Formed in the holding part 94 are through openings 96, each of which is associated with a respective injection element 56. Fixed to the edge 98 of each through opening is a fixing element 100 of the holding device 88. The fixing element 100 comprises a guide member 102 below the holding part 94 and, for fixing it, a holding member 104 above the holding part 94. The injection element 56 is guided axially movably in the guide member 102 and can be displaced upward and downward thereon in the vertical direction. The hose conduit 64 is provided in order to simplify the fluidic connection between the injection element 56 and the fluid conduit 68.

The tube 60 is the constituent part of the injection element 56 that is movably guided in the guide member 102.

Fixed to the tube 60 below the fixing element 100 is a bracing member 106. The bracing member 106 takes the form of a sleeve and comprises an annular collar against which a restoring element 108 is braced, the opposite end thereof being braced against the guide member 102. The restoring element 108 takes the form of a pressure spring 110. If an upward force acts on the nozzle 62, the injection element 56 can be displaced counter to the action of the pressure spring 110. Once the force is removed, the injection element 56 is displaced back into the initial position under the action of the pressure spring 110 (FIG. 6).

Ordinarily, the bracing member 106 can be braced against a bracing part 112 of the holding device 88. The bracing part 112 is an element that is trapezoidal in cross section and is arranged below the holding part 94 and fixedly connected thereto. The bracing part 112 takes the form of a gutter.

The apparatus 10 further comprises sealing elements 114, wherein a respective sealing element 114 is associated with each injection element 56. The sealing elements 114 take the form of identical sealing disks 116.

Each sealing disk 116 is oriented coaxially in relation to the injection element 56 associated therewith. The injection element 56 passes through the sealing disk 116 and projects beyond it, in the direction of the ground 16. For example, the end of the nozzle 62 projects by approximately 5 cm to 10 cm.

It may be provided for the sealing disk 116 to be held on the bracing part 112. In the present case, however, a mounting part 118 is provided against the underside of which the sealing disk 116 is held. The mounting part 118 is formed to be trapezoidal in cross section and is also in the form of a channel, extending parallel to and below the bracing part 112. Advantageously, the mounting part 118 is arranged in a manner equidistant from the bracing part 112.

As an alternative, a sealing element may be provided that is associated with a plurality or in particular with all the injection elements 56. A sealing element of this kind may for example be a sealing bead that surrounds the injection elements 56. The sealing element may be held on a sealing element carrier that is held for example against the bracing parts 112 instead of the mounting parts 118 or is held for example against the mounting parts 118. The sealing element carrier is for example in the form of a plate, and the tubes 60 can pass through the sealing element carrier.

The mounting part 118 may be supported for example directly on the bracing part 112 or the holding part 94. In the present case, it is provided for the mounting parts 118 to be connected to one another by way of a support part 120. The support part 120 is provided with a bearer 122, which is provided below the holding part 94, and a bearer 124 that passes through the bearer 122. The bearer 124 is fixedly connected to the drive device 90 by which the holding device 88 may be raised and lowered as explained below.

As mentioned, the apparatus 10 comprises 26 injection elements 56. The injection elements 56 are arranged evenly on the holding device 88. In particular, the injection elements 56 are held on the holding device 88 in a regular hexagonal pattern. This is particularly clear from FIG. 5, which shows the apparatus 10 from below.

Two first groups 126, each of six injection elements 56 arranged in rows, and two second groups 128, each of seven injection elements 56 arranged in rows, are provided. Along the working direction 20, the first groups 126 and the second groups 128 alternate. Overall, four rows 130 of injection elements 56 are provided. The injection elements of the second groups 128 are located staggered in relation to the injection elements 56 of the first groups 126. This produces the regular hexagonal arrangement of the injection elements 56.

The sealing disks 116 are also located, regularly in relation to one another, in a hexagonal pattern on the holding device 88. The spacing between adjacent injection elements 56 is approximately 15 cm to 30 cm, for example 25 cm.

In the arrangement of rows of injection elements 56, the structure of the apparatus 10 can be simplified if a common bracing part 112 is associated with a respective first group 126. The six injection elements 56 of the first group 126 may in this case be supported laterally next to one another on the common bracing part 112 by way of the respective bracing member 106. The same applies correspondingly to the seven injection elements 56 of the respectively second groups 128. These may likewise be supported laterally next to one another on a common bracing part 112 (FIG. 3).

The same applies correspondingly to the mounting parts 118 for the sealing disks 116. Sealing disks 116 associated with a respective group 126, 128 of injection elements 56 are supported on a common mounting part 118.

The configuration above allows the construction of the holding device 88 to be simplified. Because of the four rows 130 of injection elements 56, only four bracing parts 112 and four mounting parts 118 are required.

The holding device 88 further comprises two fixing parts 132 that connect the holding part 94 to the drive device 90. The fixing parts 132 take the form of fixing plates, in each case to a certain extent in the shape of a plate. The fixing parts 132 are oriented perpendicular to the plane defined by the holding part 94, and accordingly extend vertically.

The fixing parts 132 are spaced from one another, perpendicular to the working direction 20 (and in the transverse direction 134) of the apparatus 10. An upper portion 136 of the support frame 26 is arranged between the fixing parts 132. Consequently, the fixing parts 132 receive between them in the transverse direction 134 the drive device 90, the drive device 92 and the upper portion 136 of the support frame 26.

The compressor 36 and the container 52 are also fixed to the upper portion 136.

The fixing parts comprise through openings 138. The tubes 70 of the fluid conduit 68 are able to pass through the through openings 138, with the result that the fluid conduit 68 is held on the holding device 88. In this case, the fluid conduit 68 is arranged such that the tubes 70 are located at a spacing from the holding part 94. The valves 66 and the hose conduits 64 are accommodated in the intermediate space, with the result that they are accessible in a particularly simple manner in the event of a fault.

It may be provided for the injection elements 56 to be entirely or partly replaceable, in particular manually and/or without tools. For example, it is possible to replace only the nozzle 62 (or 84, 870, 875) or the tube 60 with the nozzle. Replacement of the injection elements 56 complete, or without the valves 66, is also conceivable.

In the case of an advantageous embodiment that is not illustrated in the drawing, it may be provided for the injection elements 56 not to be displaceable in relation to the holding part 94. Instead, the injection elements 56 may be rigidly fixed to the fixing elements 100. In this case, the pressure springs 110 and the bracing members 106 may be dispensed with. The bracing parts 112 may likewise be dispensed with.

The drive device 90 serves to raise and lower the holding device 88 with the injection elements 56 held thereon. Here, the injection elements 56 may be lowered and raised in a straight line, and in particular vertically, for the purpose of insertion into and removal from the ground. Here, the injection elements 56 are moved in relation to the support frame 26.

The drive device 90 takes the form of a hydraulic drive device and comprises two piston-and-cylinder units 140. The piston-and-cylinder units 140 are arranged to left and right of the upper portion 136. A respective cylinder 142 is fixed to a traveler element 144 of the drive device 92. A respective piston 146 holds a fixing part 132. The piston-and-cylinder units 140 are oriented to be vertical.

A hydraulic pump 147 is fluidically connected, by way of hydraulic conduits (not shown), to the piston-and-cylinder units 140 and is controllable by the control device 72. As a result of electrical control of the hydraulic pump 147, the injection elements 56 may be raised and lowered purposefully.

As an alternative, it may be provided for hydraulic oil to be provided by way of the traction vehicle 34, with the result that the hydraulic pump 147 can be dispensed with. The drive device 90 could also take the form of a pneumatic drive device.

The piston-and-cylinder units 140 are mounted with the piston 146 arranged above the cylinders 142, with the result that the injection elements 56 are raised in the extended condition of the pistons 146 and are lowered in the retracted condition of the pistons 146 (FIGS. 3 and 4).

The drive device 92 serves to move the holding device 88 and hence the injection elements 56 along, and in particular in, the working direction 20 in relation to the support frame 26. For this purpose, the drive device 92 comprises a respective displacement unit 148 to the left and right of the upper portion 136. The respective displacement unit 148 is fixed to the support frame 26 and takes the form of a pneumatic displacement unit 148. Accordingly, the drive device 92 is a pneumatic drive device. As an alternative, a hydraulic drive device 92 may be provided.

Figure 2:
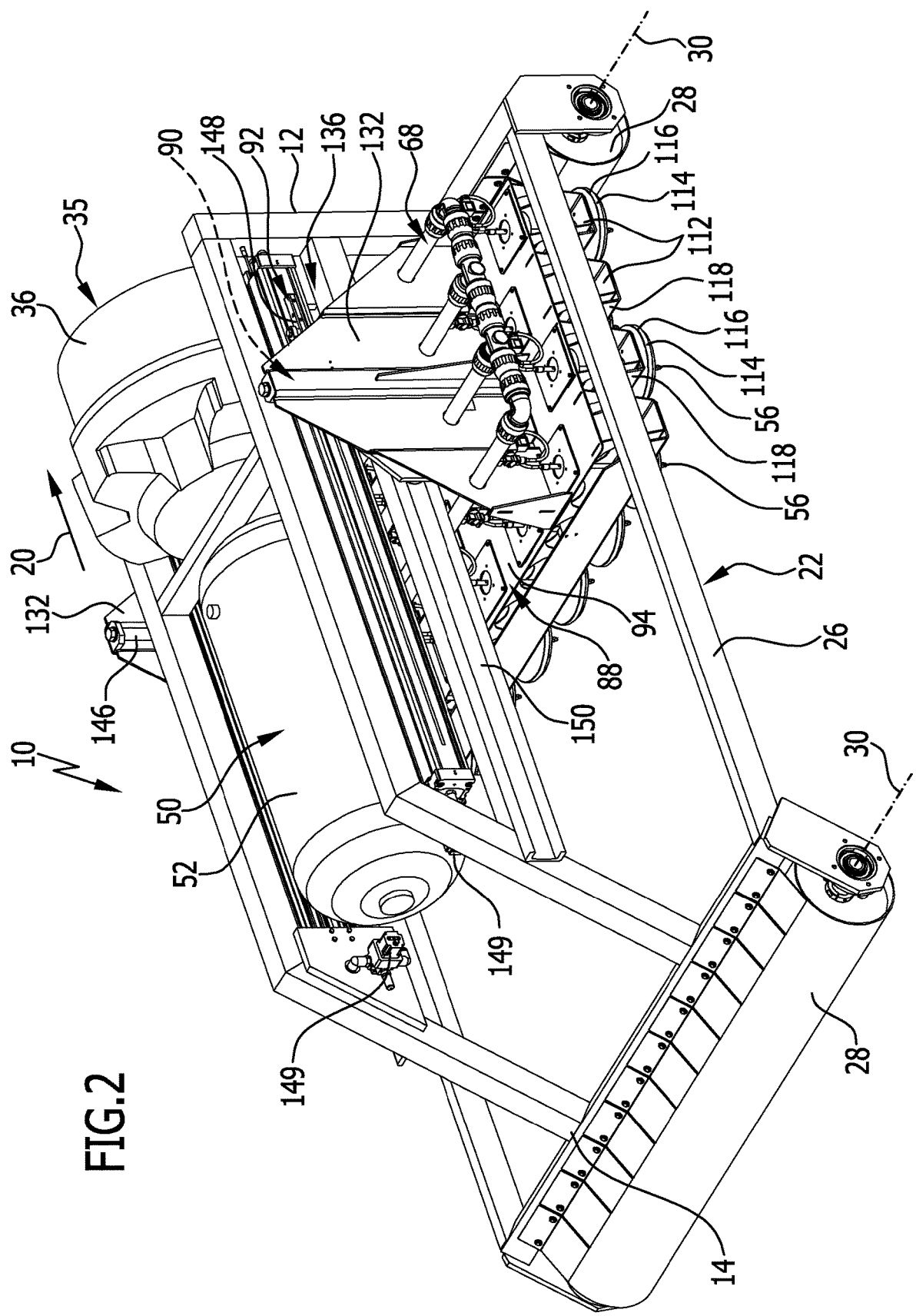
FIG. 2 shows the ground treatment apparatus from FIG. 1 once the housing has been removed.

Pneumatic cylinders of the respective displacement unit 148 are fluidically connected to the container 52 with a respective valve 149 placed in between (FIG. 2, where a compressed gas conduit has been omitted from the drawing). The valves 149 are electrically controllable by the control device 72.

As an alternative, it may be provided for the pneumatic cylinders to be configured to be acted upon, by an individual or common pump (not shown), with compressed air that is controllable by the control device 72.

Controlled by the control device 72, the displacement unit 148 can be purposefully controlled such that the respective traveler element 144 and hence the injection elements 56 can be displaced in a straight line, and in particular horizontally, in relation to the support frame 26.

The traveler element 144 takes the shape of a plate and is fixed to the displacement unit 148. In addition, the traveler element 144 can engage in a respective guide 150 to left and right of the upper portion 136. The guide 150 takes the form of a rail extending parallel to the displacement unit 148. Rollers 152 on the traveler element 144 are guided in the rail (FIGS. 3 and 4).

The injection elements 56 are thus, as a whole, each longitudinally displaceable in a straight line (along, and in particular in, the working direction 20) and height-adjustable (raisable and lowerable) in relation to the support device 22.

With reference in particular to FIGS. 13 to 18, functioning of the apparatus 10 is explained below. It is assumed here, in non-restrictive manner, that pipes 154 of a grass conditioning device 156 are laid in the ground 16. The pipes 154 are arranged in the ground 16 at regular intervals and at a depth of for example approximately 10 cm from the surface.

The apparatus 10 is moved over the ground surface 18, preferably at constant speed, along the working direction 20. Compressed air is injected into the ground 16 in successive work cycles by the apparatus 10. During this, successive treatment regions 158, which succeed one another in the working direction 20, are acted upon by compressed air.

Figure 13:
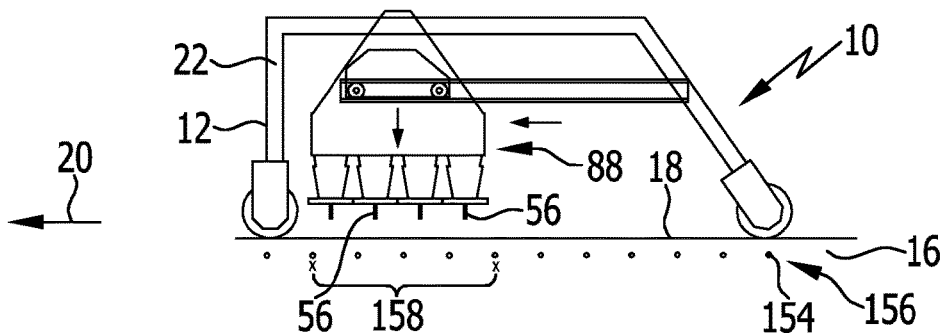
FIGS. 13-17 show the mode of functioning of the ground treatment apparatus when used as intended, during treatment of the ground, wherein the ground treatment apparatus is moved over the ground surface and the injection elements are moved in relation to the support device.
Figure 14:
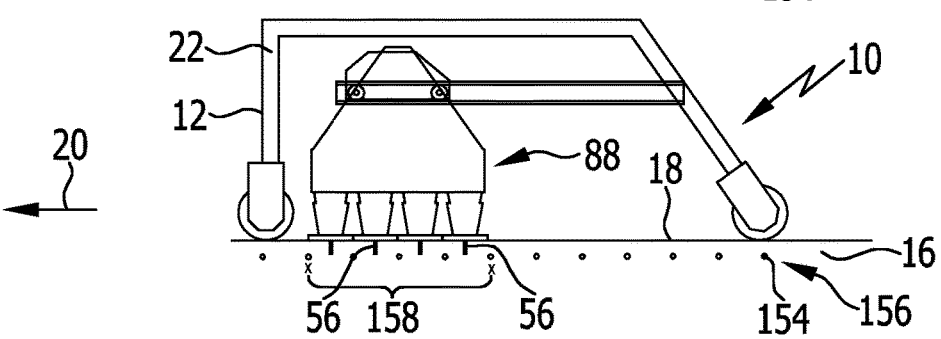

It is assumed, in non-restrictive manner, that at the beginning of the work cycle the holding device 88 is raised and is displaced in the direction of the front side 12 of the support frame 26 (FIG. 13). The control device 72 controls the drive devices 90 and 92 such that at first the holding device 88, together with the injection elements 56, is lowered vertically, with the result that the injection elements 56 engage in the ground 16. The injection elements 56 remain stationary in this position, with movement relative to the support frame 26 along the working direction 20. This is because the apparatus 10 continues to be moved in the working direction 20. The pneumatic cylinders of the drive device 92 may be switched without being pressurized, with the result that the holding device 88 need not be actively displaced in opposition to the working direction 20 relative to the support device 22.

However, it is also conceivable for the drive device 92 to be activated.

While the injection elements 56 remain stationary in the treatment region 158, the ground 16 is acted upon with compressed air through the nozzles 62. For example, an individual jet of compressed air is applied for a period of approximately 0.3 seconds and at a pressure of approximately 5 to 10 bar, preferably approximately 7 bar.

Figure 15:
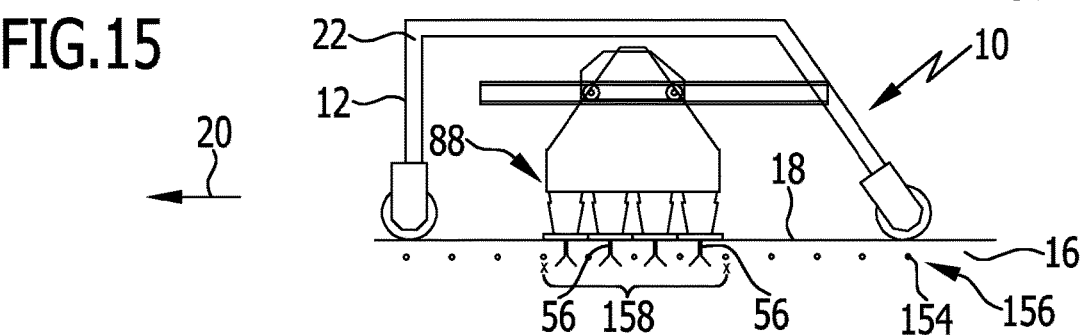

FIGS. 15 and 18 show how the respective jet of compressed air coming from a nozzle 62 reaches an effective region 160 in the ground 16. As a result of the choice of parameters for the injection of compressed air, the effective region 160 is large enough for the region between adjacent pipes 154 and also a region below the pipes 154 to be reached by the compressed air. Mutually adjoining effective regions 160 thus ensure that the ground 16 is acted upon with compressed air over substantially the entire treatment region 158. In the drawing, the borders of the treatment region 158 are indicated by two "X" in FIGS. 13 to 18.

The injection of compressed air results in loosening of the soil of the ground 16. Water and air can penetrate into the ground 16 better and promote growth of the grass cover 54. Moreover, the action of drainage in the ground 16 is improved. The ground can be aerated homogeneously.

Figure 16:
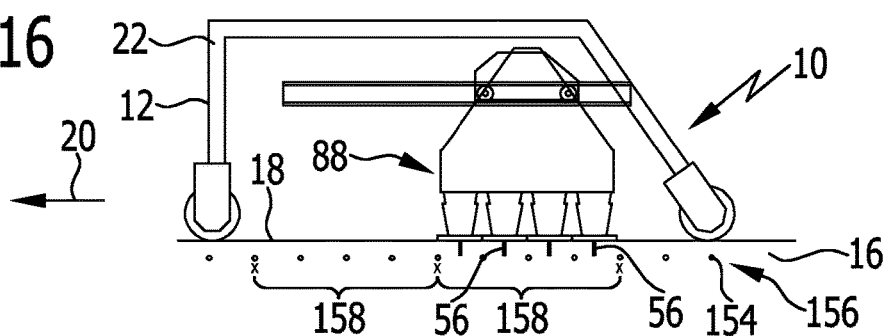

As the cycle continues, the injection elements 56 are displaced further in relation to the support frame 26, because the latter continues to move in the working direction 20 (FIG. 16).

Figure 17:
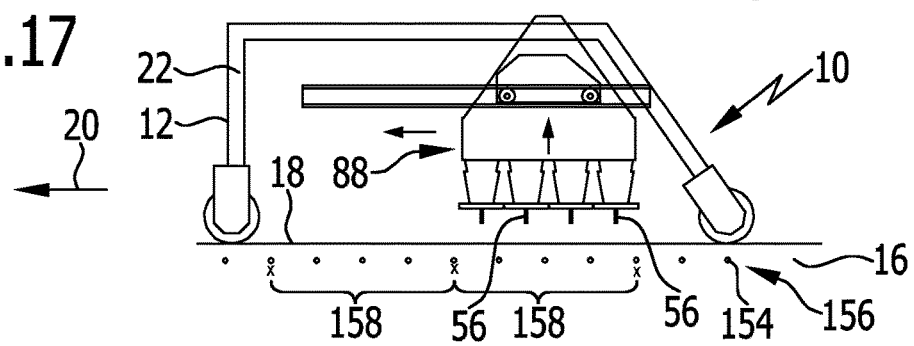

Then, the injection elements 56 are raised (FIG. 17). Thereafter the injection elements 56 are displaced in the working direction 20 in relation to the support frame 26 at a speed that, at least at times, is greater than the speed at which the apparatus 10 advances. The injection elements 56, as it were, catch the support frame 26 up again. This provides the possibility that the injection elements 56 are displaced up to the front side 16 of the support frame 26 again. As a result, the apparatus 10 adopts the configuration shown in FIG. 13 again, but has moved on somewhat in the working direction 20.

Then, a treatment region 158 that, as seen in the working direction 20, is downstream of the first treatment region 158 that was worked on can be acted upon by compressed air.

The control device 72 controls the drive devices 90, 92 such that successive treatment regions 158 that are reached by the injection elements 56 adjoin one another. In this way, the whole of the ground 16 is worked on.

In the present case, the depth of penetration of the injection elements 56 into the ground 16 is adjusted such that only the nozzle 62 and some of the tube 60 engage in the ground 16. Here, a depth of penetration of approximately 8 cm is pre-set, with the result that the nozzles 62 have a safety clearance of approximately 2 cm from the pipes 154 and a collision of the nozzles 62 with the pipes 154 can be avoided. As a result of the bubble-like effective regions 160 resulting from the configuration of the nozzle 62, the soil of the ground 16 below the pipes 154 can also be loosened. This has proved particularly beneficial in practice for preventing the ground 16 around the pipes 154 from drying out.

For the circumstance that a nozzle 62 already strikes against an obstacle as it penetrates into the ground 16, shown by the example of a stone 162 in FIG. 6, the reader may be referred to the statements above. The injection element 56 is displaced in opposition to the action of the pressure spring 110.

In an advantageous embodiment, it is provided for the lowered injection elements 56 that engage in the ground 16 to be raised slightly before the fluid injection, for example by 0.3 cm to 0.5 cm. This produces a free space in the ground 16, below the nozzles 62. The presence of the free space, it has been found in practice, proves advantageous for the propagation of compressed air and for the size of the effective region 160. In relation to the working direction 20, however, the injection elements 56 remain stationary with respect to the ground 16 in this variant as well, wherein they are moved in relation to the support frame 26.

In the lowered condition of the holding device 88, the sealing disks 116 make sealing contact with the ground surface 18. This ensures that the compressed air does not escape over the ground surface 18 but remains in the ground 16. Uneven places as a result of the jet of compressed air are prevented. Moreover, it is advantageous that, in the lowered condition, the drive device 90 continues to bias the holding device 88 and hence the sealing disks 116 in the direction of the ground 16 by way of a bracing force. As a result, the sealing disks 116 can lie on the ground surface 18 with particularly good sealing effect.

The apparatus 10 in accordance with the invention allows the whole of the ground 16 to be managed swiftly, in a quasi continuous operation. It is possible to move the apparatus 10 over the ground surface 18 and, as a result of the movement, controlled by the control device 72, of the injection elements 56 in relation to the support device 22, to act successively at the treatment regions 158 with compressed air on the whole of the ground 16. In particular, it is not necessary to stop the apparatus 10 while compressed air is injected. As a result, advance need not be repeatedly interrupted, and the pace of work can be kept high. The apparatus 10 is therefore in particular suitable for ground management of relatively large ground surfaces 18, in particular soccer fields.

Figure 19:
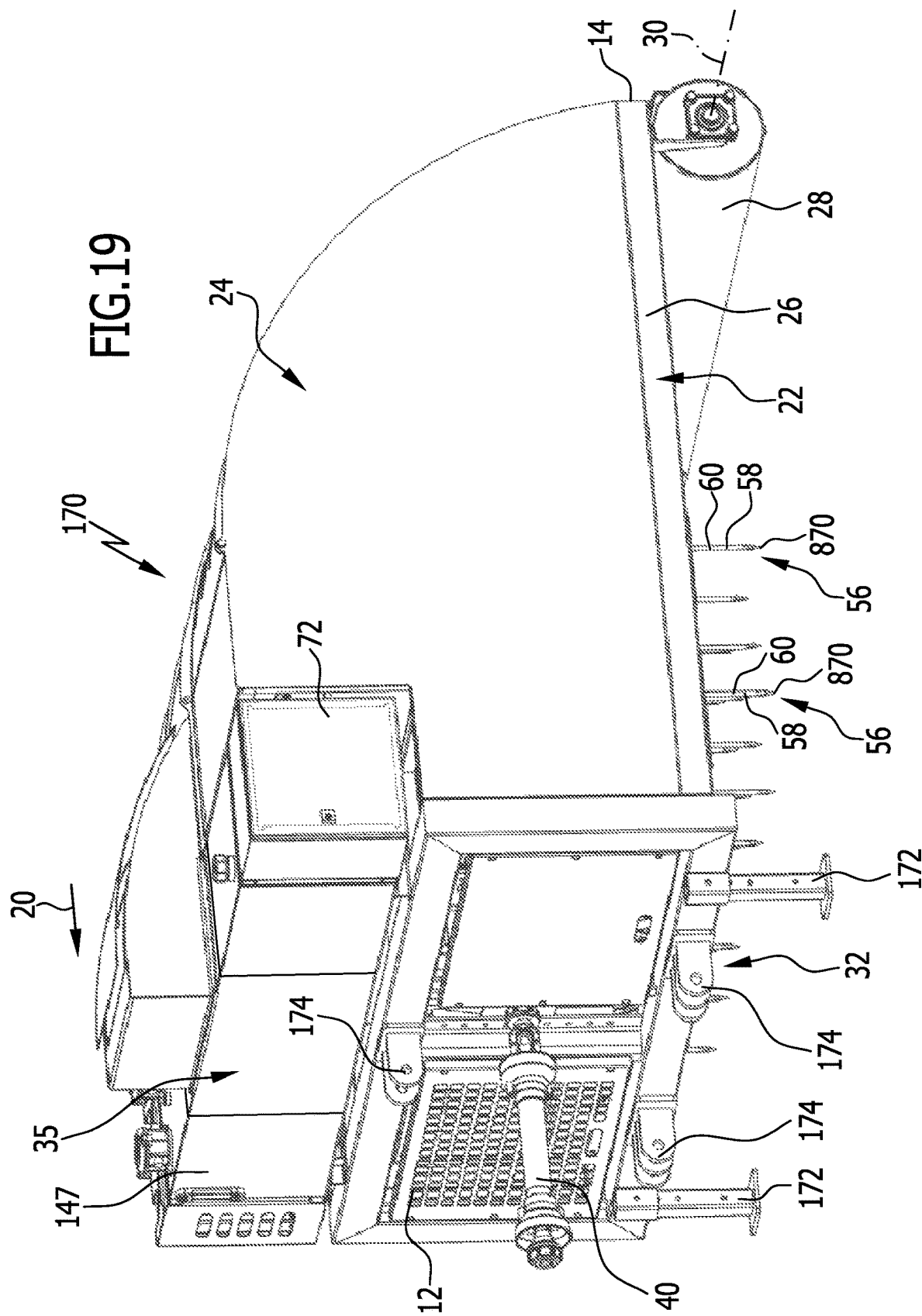
FIG. 19 shows a perspective illustration of a further advantageous embodiment of a ground treatment apparatus in accordance with the invention.

FIG. 19 shows, in a perspective illustration, an advantageous embodiment of a ground treatment apparatus in accordance with the invention that is designated by the reference numeral 170 (apparatus 170). For like or equivalent features and components of the apparatuses 10 and 170, identical reference numerals are used. The advantages that are achievable with the apparatus 10 can likewise be achieved with the apparatus 170. In order to avoid repetition, the reader may thus be referred to the statements above.

Where no differences between the apparatuses 10 and 170 are explained below, they are the same from a functional point of view.

In particular, the apparatus 170 is constructed to perform a fluid injection into the ground 16, as explained in the case of the apparatus 10 by the example of FIGS. 13 to 18. Accordingly, in the case of the apparatus 170 as well, the injection elements 56 can be lowered and penetrate into the ground 16, remain stationary in the ground 16 as the support device 22 continues to move, inject fluid into the ground 16, be raised and be displaced in the working direction 20 again in relation to the support device 22.

The injection elements 56 may be raised slightly before the fluid injection in order to produce a free space in the ground and to enhance the action of the fluid injection. The fluid injection may be performed such that, of the effective region 160, respective regions between the pipes 154 and below the pipes 154 of a grass conditioning device 156 can be reached.

In the case of the apparatus 170, the holding device 88 and the drive devices 90, 92 are likewise used, as in the apparatus 10, as are further the compressor 36 and the storage device 50. In a manner corresponding to the apparatus 10, the storage device 50 is fluidically connected to the injection elements 56. Likewise, sealing disks 114 or the above-mentioned sealing element carrier and restoring elements 108 are provided. The above-mentioned components are not visible in FIG. 19 because of the housing 24, which is illustrated there as substantially closed.

In the case of the apparatus 170, only one roller-shaped surface contact element 28 is used, and this is held on the support frame 26 in the region of the rear side 14 and defines the contact plane of the apparatus 170. At the front side 12, there is no roller-shaped surface contact element in the case of the apparatus 170. Instead, support elements 172 are arranged on the support frame 26. The apparatus 170 can be supported by way of the support elements 172 when it is not in operation. For operation of the apparatus 170, the support elements 172 are removed or are displaced on the support frame 26 such that they do not make contact with the ground surface 18.

In the case of the apparatus 170, the coupling device 32 comprises coupling elements 174 that are fixed to the support frame 26 or formed thereby. The coupling elements 174, in the present case three in number, make it possible to fix the apparatus 170 to the traction vehicle 34, which is not illustrated in FIG. 19. Corresponding coupling elements on the traction vehicle 34 couple with the coupling elements 174, as a result of which the apparatus 170 can be supported on the traction vehicle 34 on one side. If the coupling elements of the traction vehicle 34 are height-adjustable, this gives the possibility for example of varying the force of surface contact of the apparatus 170 on the ground surface 18 by way of the surface contact element 28. This proves advantageous to achieve an optimum result in smoothing of the ground.

In the case of the apparatus 170, the nozzles 870 illustrated in FIG. 19 are used for example to treat hybrid grass.

LIST OF REFERENCE NUMERALS

10 Ground treatment apparatus (apparatus)
12 Front side
14 Rear side
16 Ground
18 Ground surface
20 Working direction 22 Support device
24 Housing
26 Support frame
28 Surface contact elements
30 Axis of rotation
32 Coupling device
34 Traction vehicle
35 Fluid providing device
36 Compressor
38 Auxiliary power takeoff
40 Shaft
42 Gear
44 Belt pulley
46 Belt pulley
48 Belt
50 Storage device
52 Container
54 Grass cover
56 Injection element
58 Lance
60 Tube
62 Nozzle
64 Hose conduit
66 Valve
68 Fluid conduit
70 Tube
72 Control device
74 Axis
76 Supply channel
78 Exit channel
80 Angle
82 Axis
84 Nozzle
86 Exit channel
870 Nozzle
875 Nozzle
876 Portion
88 Holding device
90 Drive device
92 Drive device
94 Holding part
96 Through opening
98 Edge
100 Fixing element
102 Guide member
104 Holding member
106 Bracing member
108 Restoring element
110 Pressure spring
112 Bracing part
114 Sealing element
116 Sealing disk
118 Mounting part
120 Support part
122 Bearer
124 Bearer
126 $1^{st}$ group
128 $2^{nd}$ group
130 Row
132 Fixing part
134 Transverse direction
136 Upper portion
138 Through opening
140 Piston-and-cylinder unit
142 Cylinder
144 Traveler element
146 Piston
147 Hydraulic pump
148 Displacement unit
149 Valve
150 Guide
152 Rollers
154 Pipe
156 Grass conditioning device
158 Treatment region
160 Effective region
162 Stone
170 Apparatus
172 Support element
174 Coupling element

The invention claimed is:

1. A ground treatment apparatus for ground with grass growth, the ground treatment apparatus comprising:
a support device;
a plurality of injection elements held directly or indirectly on the support device;
a fluid providing device that is fluidically connected to the plurality of injection elements; and
at least one drive device adapted to lower and raise the plurality of injection elements in relation to the support device and to move the plurality of injection elements along a working direction of the ground treatment apparatus, wherein
the plurality of injection elements are inserted into the ground by being lowered in order to inject fluid into the ground in a treatment region, the plurality of injection elements remaining stationary during engagement in the ground in the treatment region, with relative movement in relation to the support device being moved in the working direction,
the plurality of injection elements are raised after an injection of fluid into the ground and are moved in the working direction in relation to the support device,
the plurality of injection elements, on being lowered again, are inserted into the ground in a further treatment region that is downstream of the first-mentioned treatment region, as seen in the working direction, and
the ground treatment apparatus comprises a holding device having a holding part on which the plurality of injection elements are held, the holding device being coupled to the support device by way of the at least one drive device, with the plurality of injection elements being raised and lowered in common as well as being moved along the working direction in common.

2. The ground treatment apparatus in accordance with claim 1, wherein the ground treatment apparatus is configured such that treatment regions that succeed one another in the working direction adjoin one another or overlap one another.

3. The ground treatment apparatus in accordance with claim 1, wherein the at least one drive device is controllable electrically, and wherein the ground treatment apparatus comprises a control device for controlling the at least one drive device.

4. The ground treatment apparatus in accordance with claim 1, wherein the plurality of injection elements are at least one of being lowered and raised by the at least one drive device in a straight line and moved along the working direction in a straight line in relation to the support device.

5. The ground treatment apparatus in accordance with claim 1, wherein the plurality of injection elements are at least one of being displaced along the working direction and being displaced for raising and lowering in relation to the support device.

6. The ground treatment apparatus in accordance with claim 1, wherein the at least one drive device is configured as at least one of a mechanical, electrical, hydraulic, pneumatic and magnetic drive device.

7. The ground treatment apparatus in accordance with claim 1, wherein the ground treatment apparatus comprises, for raising and lowering the plurality of injection elements, a first drive device and a second drive device for moving the plurality of injection elements along the working direction.

8. The ground treatment apparatus in accordance with claim 1, wherein, by means of the at least one drive device, a force bracing against the ground is applied to the holding device, at least during the injection of fluid.

9. The ground treatment apparatus in accordance with claim 1, wherein there are formed in the holding part through openings through which the plurality of injection elements pass and at the edges whereof the plurality of injection elements are immovably fixed or movably guided, wherein the plurality of injection elements are fluidically connected to the fluid providing device via one or more fluid conduit being connected to the respective injection element on the side of the holding part facing away from the ground.

10. The ground treatment apparatus in accordance with claim 1, wherein the holding part is configured as a plate, at least in sections.

11. The ground treatment apparatus in accordance with claim 1, wherein the plurality of injection elements are displaceable in relation to the holding part, wherein a respective injection element is displaceable in relation to the holding part counter to an action of a respective restoring element that biases the injection element in the direction of the ground, wherein the holding device comprises or forms a bracing part against which the injection element is braced in a direction towards the ground.

12. The ground treatment apparatus in accordance with claim 1, wherein the ground treatment apparatus comprises at least one sealing element that is supported on the holding device and that, in a lowered state of the holding device, lies on the ground, wherein the at least one sealing element or an edge of the at least one sealing element surrounds at least one injection element of the plurality of injection elements.

13. The ground treatment apparatus in accordance with claim 12, wherein a respective sealing element for lying on the ground is associated with each injection element, wherein the respective injection element passes through the at least one sealing element and is oriented to be concentric with the at least one sealing element.

14. The ground treatment apparatus in accordance with claim 1, wherein, after the plurality of injection elements have been inserted into the ground and before the injection of fluid is performed, the plurality of injection elements are raised by means of the at least one drive device in order to provide a free space in the ground below the plurality of injection elements.

15. The ground treatment apparatus in accordance with claim 1, wherein the injection of fluid is executed comprising at least one of the following parameters:
  individual pressure stroke, or a plurality of successive pressure strokes;
  fluid pressure of approximately 5 bar to 10 bar;
  duration of each pressure stroke approximately 0.1 s to 0.5 s;
  depth of engagement of the plurality of injection elements in the ground approximately 5 cm to 15 cm.

16. The ground treatment apparatus in accordance with claim 1, wherein the plurality of injection elements comprise a respective nozzle, the nozzle being disposed at an end or at an end portion of the respective injection element.

17. The ground treatment apparatus in accordance with claim 16, wherein the nozzle comprises two or more exit channels for fluid that are each oriented at an angle to an axial supply channel of the injection element, the two or more exit channels being arranged symmetrically to one another on the nozzle.

18. The ground treatment apparatus in accordance with claim 1, wherein the plurality of injection elements are positioned in relation to one another such that effective regions of the injection of fluids of the individual nozzles respectively occurring in the treatment region overlap one another or adjoin one another.

19. The ground treatment apparatus in accordance with claim 1, comprising ten or more injection elements.

20. The ground treatment apparatus in accordance with claim 1, wherein the plurality of injection elements are at a spacing of approximately 15 cm to 30 cm from one another.

21. The ground treatment apparatus in accordance with claim 1, wherein the plurality of injection elements are disposed in an arrangement corresponding to one another.

22. The ground treatment apparatus in accordance with claim 21, wherein the arrangement forms a hexagonal or rectangular pattern.

23. The ground treatment apparatus in accordance with claim 1, wherein a penetration depth of the plurality of injection elements into the ground of approximately 5 cm to 15 cm.

24. The ground treatment apparatus in accordance with claim 1, wherein the ground treatment apparatus comprises an adjustment device by means of which the penetration depth of the plurality of injection elements into the ground is adjustable.

25. The ground treatment apparatus in accordance with claim 1, wherein the plurality of injection elements are individually entirely or partly replaceable.

26. The ground treatment apparatus in accordance with claim 1, wherein the fluid is or comprises a compressed gas or a compressed gas mixture, or wherein the fluid is or comprises a liquid.

27. The ground treatment apparatus in accordance with claim 1, wherein the fluid providing device comprises a compressor for providing fluid and a storage device, fluidically connected thereto, for the fluid, which is fluidically connected to the plurality of injection elements.

28. The ground treatment apparatus in accordance with claim 1, wherein the fluid providing device comprises a fluid conduit to which the plurality of injection elements are connected in parallel, the plurality of injection elements being fluidically connected to the fluid conduit via valves, the ground treatment apparatus further comprising a control device adapted to selectively switch the valves.

29. The ground treatment apparatus in accordance with claim 1, wherein at least one roller-shaped surface contact element is arranged on the support device for lying on the ground surface and is arranged upstream or downstream of the plurality of injection elements, as seen in the working direction.

30. The ground treatment apparatus in accordance with claim 1, wherein the ground treatment apparatus comprises at least one of a motor drive for travelling on the ground surface and a coupling device for coupling to a traction or pusher vehicle.

31. A ground treatment apparatus for ground with grass growth, the ground treatment apparatus comprising
  a support device;

a plurality of injection elements held directly or indirectly on the support device;

a fluid providing device that is fluidically connected to the plurality of injection elements; and at least one drive device adapted to lower and raise the plurality of injection elements in relation to the support device and to move the plurality of injection elements along a working direction of the ground treatment apparatus, wherein the plurality of injection elements are inserted into the ground by being lowered in order to inject fluid into the ground in a treatment region, the plurality of injection elements remaining stationary during engagement in the ground in the treatment region, with relative movement in relation to the support device being moved in the working direction, the plurality of injection elements are raised after an injection of fluid into the ground and are moved in the working direction in relation to the support device, the plurality of injection elements, on being lowered again, are inserted into the ground in a further treatment region that is downstream of the first-mentioned treatment region, as seen in the working direction, and after the plurality of injection elements have been inserted into the ground and before the injection of fluid is performed, the plurality of injection are raised by means of the at least one drive device in order to provide a free space in the ground below the plurality of injection elements.

* * * * *